(12) United States Patent
Bermundo et al.

(10) Patent No.: US 11,922,231 B1
(45) Date of Patent: Mar. 5, 2024

(54) PRINTING DEVICE CONNECTIVITY MANAGER FOR A DIGITAL FRONT END

(71) Applicant: Kyocera Document Solutions Inc., Osaka (JP)

(72) Inventors: Neil-Paul Payoyo Bermundo, Glendora, CA (US); Edwin Philip Lockwood, Brea, CA (US); Jayant Bhatt, Torrance, CA (US); Yoshihiro Osada, Torrance, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 18/200,861

(22) Filed: May 23, 2023

Related U.S. Application Data

(63) Continuation-in-part of application No. 18/065,845, filed on Dec. 14, 2022.

(51) Int. Cl.
*G06F 3/12* (2006.01)
*G06F 9/54* (2006.01)

(52) U.S. Cl.
CPC ............ *G06F 9/541* (2013.01); *G06F 3/1209* (2013.01); *G06F 3/1225* (2013.01); *G06F 3/1285* (2013.01)

(58) Field of Classification Search
CPC ...... G06F 9/541; G06F 3/1209; G06F 3/1225; G06F 3/1285

USPC ........................................................ 358/1.13
See application file for complete search history.

(56) References Cited

U.S. PATENT DOCUMENTS

| | | | |
|---|---|---|---|
| 2004/0042039 A1* | 3/2004 | Kodera | G06K 15/00 399/9 |
| 2012/0062930 A1* | 3/2012 | Toyazaki | G06F 3/1284 358/1.14 |
| 2017/0346973 A1* | 11/2017 | Kusakabe | H04N 1/00408 |

* cited by examiner

*Primary Examiner* — Allen H Nguyen
(74) *Attorney, Agent, or Firm* — Millen, White, Zelano & Branigan P.C.; William F. Nixon

(57) ABSTRACT

A printing system includes a digital front end (DFE) system connected to a plurality of printing devices. The DFE system manages printing operations to the plurality of printing devices. The DFE system also includes a printing device connectivity manager to manage connections with the printing devices. Printing connectivity modules are installed at the printing device connectivity manager using application programming interfaces (APIs) that are loaded at the creation of the printing connectivity modules. The DFE system also includes a display device connectivity manager to manage connections with display devices using display connectivity modules and display connectivity APIs. The DFE system also includes a storage connectivity manager to manage data storage and storage devices using storage connectivity modules and storage connectivity APIs.

20 Claims, 20 Drawing Sheets

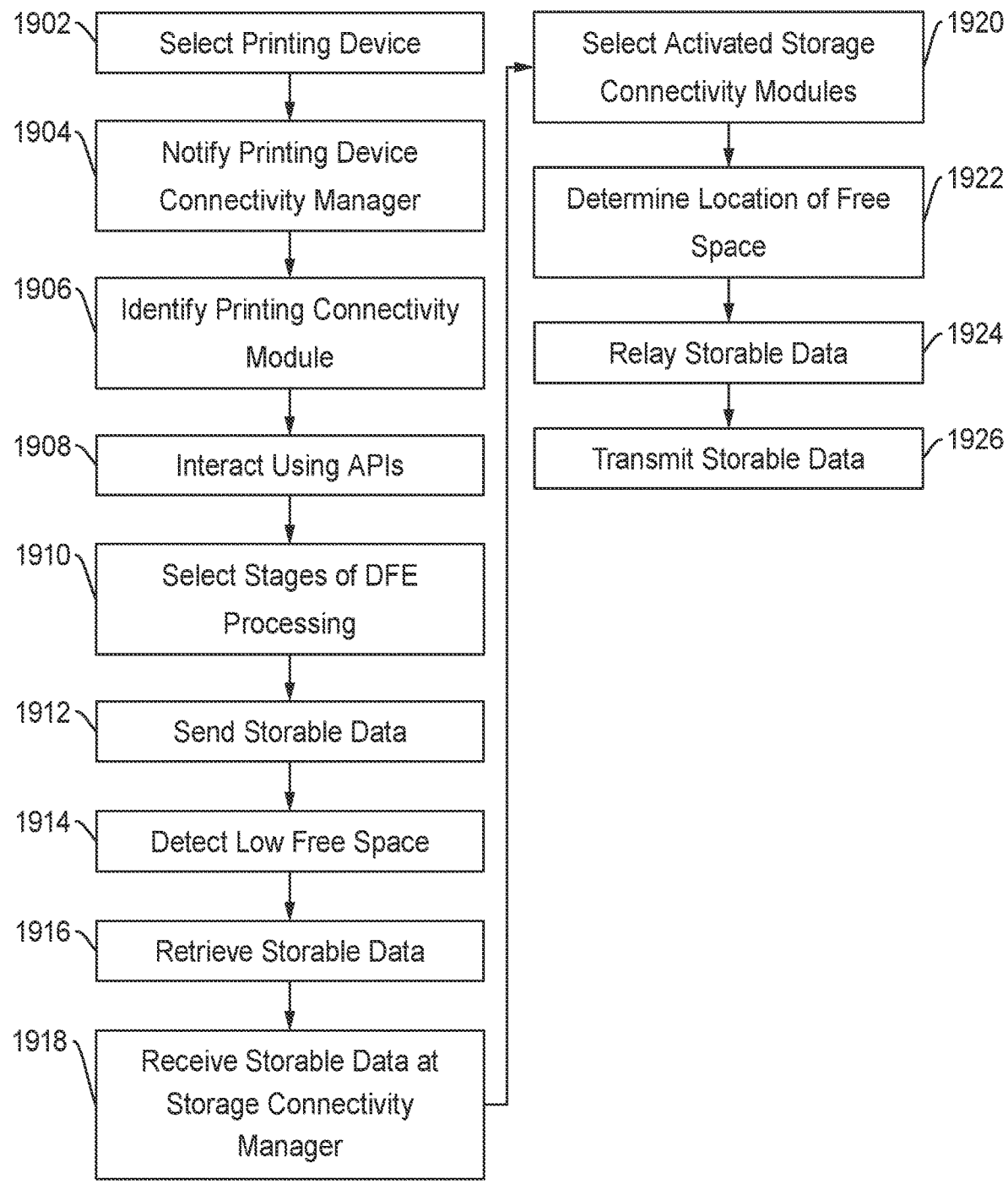

PRINTING DEVICE CONNECTIVITY MANAGER FOR A DIGITAL FRONT END

FIELD OF THE INVENTION

The present invention relates to a printing device connectivity manager to manage workflow between a digital front end and a plurality of printing devices. More particularly, the present invention relates to using printing connectivity modules within the printing device connectivity manager to manage workflow to specific printing devices.

DESCRIPTION OF THE RELATED ART

The development of digital front end (DFE) systems involves the design and implementation of the connectivity to printing devices. This feature may be accomplished by adding explicit software implementations that include modification to the DFE software in order to send print jobs to the new printing devices. For example, a DFE may be developed to initially send print jobs to printing devices that are on the network via TCP/IP protocols or using network sockets programming for printing devices with discoverable internet protocol (IP) addresses. This feature also may need information on how the DFE will communicate with the printing device firmware in the printing device itself that is being connected.

Whenever a new printing device is connected to the DFE system, the DFE software code is modified, re-built, or recompiled, and then re-released as a new version of DFE software. This development phase can take a lot of time and resources. It also may cause potential problems with other existing connectivity modules as well as the DFE system itself.

SUMMARY OF THE INVENTION

A method for managing a printing system is disclosed. The method includes enabling a printing device connectivity manager at a digital front end (DFE). The method also includes creating a printing connectivity module in the printing device connected to the DFE. The printing connectivity module corresponds to a printing device connected to the DFE. The method also includes loading a plurality of application programming interfaces (APIs) at the printing device connectivity manager to implement the printing connectivity module. The method also includes installing the plurality of APIs to the printing connectivity module. The plurality of APIs provides interfaces within the printing connectivity module to manage, handle, or transmit a translated print job within the DFE. The method also includes interacting with the printing device from the DFE using the printing connectivity module.

A method for managing workflow within a printing system is disclosed. The method includes detecting a printing device connected to a digital front end (DFE) to be processed at the printing device. The method also includes translating a print job within the DFE to be processed at the printing device. The method also includes notifying, by the DFE, the printing device connectivity manager to open communication with the printing device. The method also includes communicating with the printing device with a printing connectivity module located in the printing device connectivity manager. The printing connectivity module includes a plurality of application programming interfaces (APIs). The method also includes sending the print job to the printing device using at least one of the plurality of APIs within the printing connectivity module corresponding to the printing device.

A digital front end (DFE) is disclosed. The DFE includes a processor. The DFE also includes a memory connected to the processor. The memory stores instructions that, when executed on the processor, configure the DFE to detect a printing device connected to the DFE using a printing device connectivity manager. The instructions also configure the DFE to translate a print job within the DFE to be processed at the printing device. The instructions also configure the DFE to notify the printing device connectivity manager to open communication with the printing device. The instructions also configure the DFE to communicate with the printing device with a printing connectivity module located in the printing device connectivity manager. The printing connectivity module includes a plurality of application programming interfaces (APIs). The instructions also configure the DFE to send the print job to the printing device using at least one of the plurality of APIs within the printing connectivity module corresponding to the printing device.

A method for managing a printing system is disclosed. The method includes creating a first printing connectivity module in a printing device connectivity manager of a digital front end (DFE). The DFE is connected to a plurality of printing devices. The method also includes loading a first plurality of application programming interfaces (APIs) at the printing device connectivity manager to implement the first printing connectivity module to communicate to a first printing device of the plurality of printing devices. The method also includes installing the first plurality of APIs to the first printing connectivity module. The first plurality of APIs provides interface within the first printing connectivity module to manage, handle, or transmit a translated print job within the DFE. The method also includes identifying a first application module at the first printing device. The method also includes communicating with the first application module at the first printing device by the first printing connectivity module of the printing device connectivity manager at the DFE.

A method for managing printing operations within a printing system is disclosed. The method includes translating a print job into a file format at a digital front end (DFE). The DFE is connected to a plurality of printing devices. The method also includes detecting a printing device from the plurality of printing devices. The printing device processes the print job according to the file format. The method also includes determining a printing connectivity module from a plurality of printing connectivity modules within a printing device connectivity manager at the DFE to communicate with the printing device. The printing connectivity module includes a plurality of application programming interfaces (APIs) to interact with the printing device. The method also includes sending the print job to the printing device via the printing connectivity module. The method also includes receiving the print job at the printing device at an application module connected to the printing connectivity module. The method also includes processing the print job by a print engine at the printing device.

A printing system is disclosed. The printing system includes a plurality of printing devices. A printing device of the plurality of printing devices includes an application module. The printing system also includes a digital front end (DFE) connected to the plurality of printing devices. The DFE manages printing operations to the plurality of printing devices. The printing system also includes a printing device connectivity manager of the DFE to manage communications with the plurality of printing devices. The printing system also includes a printing connectivity module of a plurality of printing connectivity modules within the printing device connectivity manager. The printing connectivity module is connected to the application at the printing device. The printing connectivity module includes a plurality of application programming interfaces (APIs) to interact with the printing device. The DFE exchanges information with the printing device via the printing connectivity module.

A method for managing display operations in a printing system. The method includes enabling a display device connectivity manager at a digital front end (DFE). The method also includes creating a display connectivity module in the display device connectivity manager. The display connectivity module corresponds to a display device connected to the DFE. The method also includes loading a plurality of application programming interfaces (APIs) at the display device connectivity manager to implement the display connectivity module. The method also includes installing the plurality of APIs to the display connectivity module. The plurality of APIs provides interfaces with the display connectivity module to manage, handle, or transmit viewable page image data within the DFE. The method also includes interacting with the display device from the DFE using the display connectivity module. The method also includes providing the viewable page image data to the display device.

A method for managing printing operations in a printing system is disclosed. The method includes enabling a printing device connectivity manager at a digital front end (DFE). The method also includes creating a printing connectivity module in the printing device connectivity manager. The printing connectivity module corresponds to a printing device connected to the DFE. The method also includes loading a first plurality of application programming interfaces (APIs) at the printing device connectivity manager to implement the printing connectivity module. The method also includes installing the first plurality of APIs to the printing connectivity module. The first plurality of APIs provides interfaces within the printing connectivity module to manage, handle, or transmit a translated print job within the DFE. The method also includes enabling a display device connectivity manager at the printing device connectivity manager. The method also includes creating a display connectivity module in the display device connectivity manager. The display connectivity module corresponds to a display device connected to the DFE. The method also includes loading a second plurality of application programming interfaces (APIs) at the display device connectivity manager within the printing device connectivity manager to implement the display connectivity module. The method also includes installing the second plurality of APIs to the display connectivity module. The second plurality of APIs provides interfaces within the display connectivity module to manage, handle, or transmit viewable page image data of the translated print job provided by the printing connectivity module within the DFE. The method also includes interacting with the display device from the DFE using the display connectivity module. The method also includes providing the viewable page image data to the display device.

A digital front end (DFE) server includes a processor. The DFE also includes a memory connected to the processor. The memory stores instructions that, when executed on the processor, configure the DFE to enable a display device connectivity manager at the DFE. The instructions also configure the DFE to create a display connectivity module in the display device connectivity manager. The display connectivity module corresponds to a display device connected to the DFE. The instructions also configure the DFE to load a plurality of application programming interfaces (APIs) at the display device connectivity manager to implement the display connectivity module. The instructions also configure the DFE to install the plurality of APIs to the display connectivity module. The plurality of APIs provides interfaces within the display connectivity module to manage, handle, or transmit viewable page image data within the DFE. The instructions also configure the DFE to interact with the display device from the DFE using the display connectivity module. The instructions also configure the DFE to provide the viewable page image data to the display device.

A method for managing storage operations in a printing system is disclosed. The method includes enabling a storage connectivity manager at a digital front end (DFE). The method also includes creating a first storage connectivity module in the storage connectivity manager. The first storage connectivity module corresponds to a first data storage of the DFE. The method also includes loading a plurality of application programming interfaces (APIs) at the storage connectivity manager to implement the first storage connectivity module. The method also includes installing the plurality of APIs to the first storage connectivity module. The plurality of APIs provides interfaces within the first storage connectivity module to manage, handle, or transmit storable data within the DFE. The method also includes interacting with the first data storage of the DFE using the first storage connectivity module. The method also includes providing the storable data to the first data storage.

A method for managing printing operations in a printing system is disclosed. The method includes enabling a printing device connectivity manager at a digital front end (DFE). The method also includes creating a printing connectivity module in the printing device connectivity manager. The printing connectivity module corresponds to a printing device connected to the DFE. The method also includes loading a first plurality of application programming interfaces (APIs) at the printing device connectivity manager to implement the printing connectivity module. The method also includes installing the first plurality of APIs to the printing connectivity module. The first plurality of APIs provides interfaces within the printing connectivity module to manage, handle, or transmit a translated print job within the DFE. The method also includes enabling a storage connectivity manager at the printing device connectivity manager. The method also includes creating a storage connectivity module in the storage connectivity manager. The storage connectivity module corresponds to a data storage for the DFE. The method also includes loading a second plurality of application programming interfaces (APIs) at the storage connectivity manager within the printing device connectivity manager to implement the storage connectivity module. The method also includes installing the second plurality of APIs to the storage connectivity module. The second plurality of APIs provides interfaces within the storage connectivity module to manage, handle, or transmit storable data related to the translated print job provided by the printing connectivity module within the DFE. The method also includes interacting with the data storage of the DFE using the storage connectivity module. The method also includes providing the storable data to the data storage.

A digital front end (DFE) server is disclosed. The DFE includes a processor. The DFE also includes a memory connected to the processor. The memory stores instructions that, when executed on the processor, configure the DFE to enable a storage connectivity manager at the DFE. The instructions also configure the DFE to create a storage connectivity module in the storage connectivity manager. The storage connectivity module corresponds to a storage device connected to the DFE. The instructions also configure the DFE to load a plurality of application programming interfaces (APIs) at the storage connectivity manager to implement the storage connectivity module. The instructions also configure the DFE to install the plurality of APIs to the storage connectivity module. The plurality of APIs provides interfaces within the storage connectivity module to manage, handle, or transmit storable data within the DFE. The instructions also configure the DFE to interact with the storage data of the DFE using the storage connectivity module. The instructions also configure the DFE to provide the storable data to the storage device.

A method for managing a printing system is disclosed. The method includes enabling a printing device connectivity manager at a digital front end (DFE). The method also includes creating a printing connectivity module in the printing device connectivity manager. The printing connectivity module corresponds to a printing device connected to the DFE. The method also includes loading a first plurality of application programming interfaces (APIs) at the printing device connectivity manager to implement the printing connectivity module. The method also includes installing the first plurality of APIs to the printing connectivity module. The first plurality of APIs provides interfaces within the printing connectivity module to manage, handle, or transmit a translated print job within the DFE. The method also includes enabling a display device connectivity manager at the printing device connectivity manager. The method also includes creating a display connectivity module in the display device connectivity manager. The display connectivity module corresponds to a display device connected to the DFE. The method also includes loading a second plurality of application programming interfaces (APIs) at the display device connectivity manager within the printing device connectivity manager to implement the display connectivity module. The method also includes installing the second plurality of APIs to the display connectivity module. The second plurality of APIs provides interfaces within the display connectivity module to manage, handle, or transmit viewable page image data of the translated print job provided by the printing connectivity module within the DFE. The method also includes interacting with the display device from the DFE using the display connectivity module. The method also includes providing the viewable page image data to the display device. The method also includes enabling a storage connectivity manager at the printing device connectivity manager. The method also includes creating a storage connectivity module in the storage connectivity manager, the DFE, or the printing device connectivity manager. The storage connectivity module corresponds to a data storage for the DFE. The method also includes loading a third plurality of application programming interfaces (APIs) at the storage connectivity manager within the printing device connectivity manager to implement the storage connectivity module. The method also includes installing the third plurality of APIs to the storage connectivity module. The third plurality of APIs provides interfaces within the storage connectivity module to manage, handle, or transmit storable data related to the translated print job provided by the printing connectivity module within the DFE. The method also includes interacting with the data storage of the DFE using the storage connectivity module. The method also includes providing the storable data to the data storage.

BRIEF DESCRIPTION OF THE DRAWINGS

Various other features and attendant advantages of the present invention will be more fully appreciated when considered in conjunction with the accompanying drawings.

FIG. 19 illustrates a flowchart for a workflow within a DFE with the storage connectivity manager according to the disclosed embodiments.

DETAILED DESCRIPTION OF THE PREFERRED EMBODIMENTS

Figure 1A:
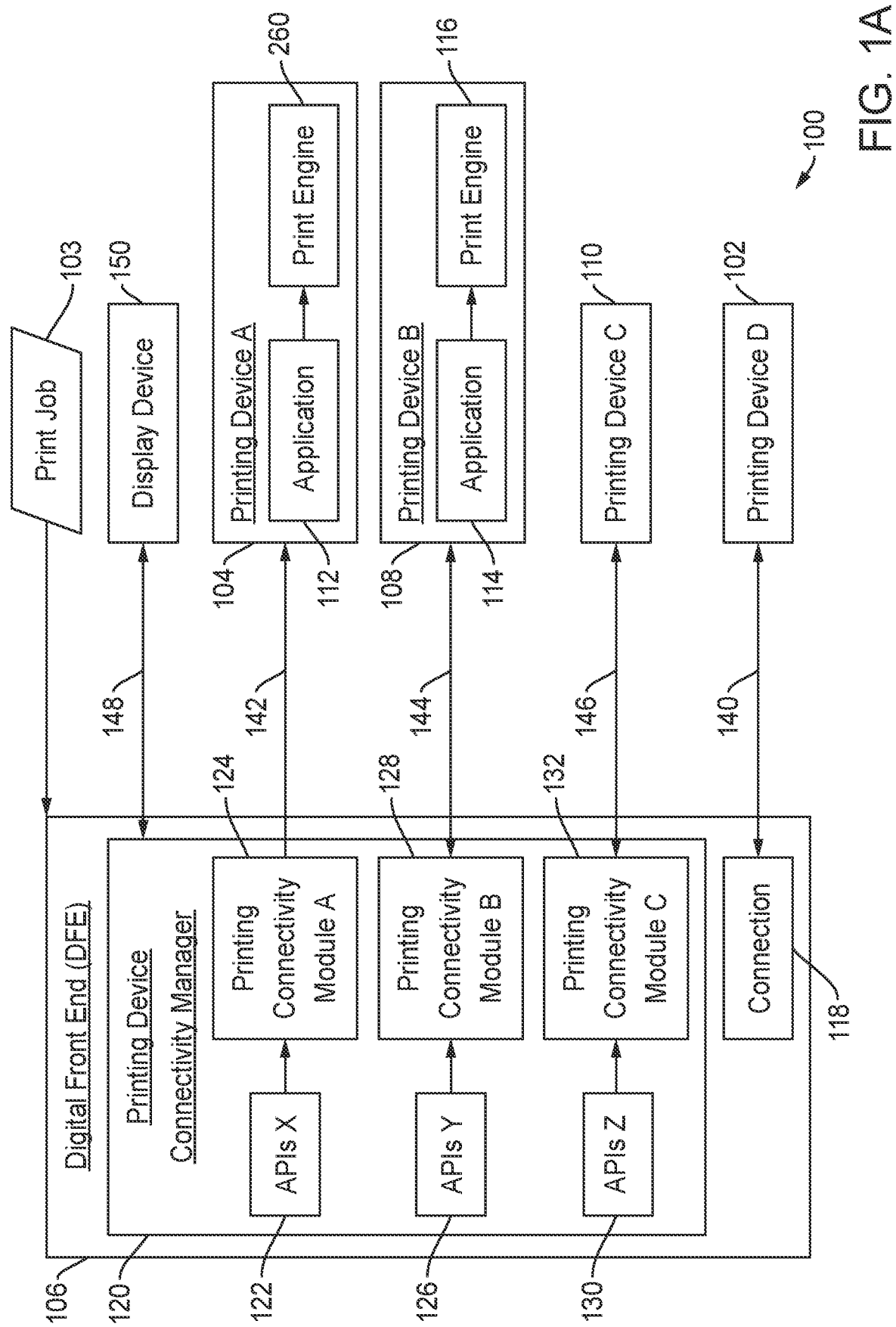
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Digital front end, or DFE, may be a system comprising a computer and software that provides services for accepting a print job, such as a PDF file, XJDF print job, image file, or other regular PDL print jobs. The DFE converts the print job to a format that a print engine can receive, process, and print directly. In some instances, a DFE resembles a printing device without actual printing hardware. It may be like printing device firmware that can process print jobs from any source including computer systems and applications. The DFE then sends the translated print jobs to connected printing devices. The DFE may have connectivity with multiple printing devices.

The development of DFE systems involves the design and implementation of the connectivity to the printing devices. In conventional systems, this feature may be accomplished by adding explicit software that includes a modification to the DFE software in order to send print jobs to new printing devices. For example, a DFE may be developed to initially send print jobs to printing devices that are on the network via TCP/IP protocol or using network sockets programming. This method would work on printing devices with known or discoverable IP addresses. It also requires information on how the DFE will communicate with the printing device firmware in the printing device itself that is being connected.

The disclosed embodiments, therefore, include a server DFE system that allows the disclosed embodiments to develop new connectivity modules in optimal time so that the DFE and the printing device can be released to the market faster, thereby satisfying demand for new customers and new services. The disclosed embodiments may reduce or eliminate development time in modifying the main DFE software. The disclosed embodiments also may add connectivity modules with the need to rebuild the DFE software.

According to the disclosed embodiments, connectivity with the printing devices will be abstracted using modules that can be installed on-demand within the DFE system. When installed, the DFE will be able to interact with the corresponding real printing device with the installable module. The disclosed embodiments include a printing device connectivity manager. The printing device connectivity manager includes printing device connectivity application programming interfaces (APIs) and printing connectivity modules.

The printing device connectivity APIs are new components in the DFE that will provide standard or pre-defined interfaces for managing, handling, and transmitting of translated print jobs to any printing device. There may be multiple printing connectivity modules that are installable plug-ins that allow connectivity with any or new printing devices. Such plug-ins may replace hardwired connectivity support for existing or legacy printing devices. Printing device connectivity relates to communication support between the DFE and printing devices. Communication is accomplished via network programming using TCP/IP or network sockets as well as other, newer technologies, such as direct USB connection, parallel port, Bluetooth™, near-field communication (NFC), direct wi-fi, direct LAN cable connectivity, and the like. Some of the communication channels are non-standard for printing and would need the disclosed DFE system to become available for printing operations.

The printing device connectivity manager is a new DFE component that will manage various new connections to printing devices that will be realized through the disclosed embodiments, through printing connectivity modules. This component may allow the DFE to dynamically interact with various printing devices. The printing device connectivity manager maintains and manages the list of printing device connections, and identifies the connection which the DFE is intending to interact. The printing device connectivity manager then facilitates connection and communication with the selected printing device.

The printing device connectivity manager may comprise the following sub-components of printing connectivity APIs and printing connectivity modules. Printing connectivity APIs include pre-defined interface functions, or APIs, for managing, handling, and transmitting of translated print jobs to any printing device. Printing connectivity modules may be an installable plug-in that can be developed independently of the DFE system. Printing connectivity modules allow for actual connectivity with the physical printing devices via any networking or communication channel, such as TCP/IP. Bluetooth™, NFC, and the like. There may be multiple printing connectivity modules that are installable plug-ins that allow connectivity with existing or new printing devices. One module may connect to a printing device via any of the following: direct USB connection, Bluetooth™, NFC, direct LAN cable, direct wi-fi, small computer system interface (SCSI), parallel port, serial or future technologies that allow computers or printing devices to be connected either wirelessly or wired.

Each printing connectivity module implements and provides the APIs identified in the printing connectivity APIs component in the DFE. This feature may be accomplished when the printing connectivity module plug-in includes a dynamic link library (DLL) or a module that can be loaded at run-time in the DFE system. Further, the printing connectivity module may provide a header file, if necessary, to facilitate integration of the connectivity module with the DFE system. In some embodiments, the connectivity module may not need to have a header file as the connectivity module can be installed into the DFE system using standard installer programs.

The plug-in feature of printing connectivity modules may be developed to add functionality such as performing the actual translation from legacy raster data format to new raster data format. Thus, to add new capabilities to the DFE, these actions may occur in the printing connectivity module.

This feature also may be an application on non-DFE products, such as office printing devices or other machines that send digital data to other machines for processing, displaying, reviewing, or storage, wherein the digital data may need to be encoded or decoded, compressed or decompressed, or translated from one format to another.

The printing device connectivity manager works with the DFE to improve printing operations workflow within the printing system. The DFE software detects printing devices through the printing device connectivity manager. In some embodiments, the printing device connectivity manager provides a list of printing devices detected or obtained through the installed printing connectivity modules. The DFE allows a user or administrator to select a printing device to which to interact. The DFE notifies the printing device connectivity manager about the selected printing device. The DFE uses printing connectivity APIs to interact, retrieve data, or send data with the selected printing device.

Thus, according to the disclosed embodiments, the disclosed DFE system may be developed independently of connectivity with printing devices. Printing connectivity modules may be developed independently of the DFE system. The DFE system can have abstract views of new printing devices, as well as having the capability to interact or communicate with new printing devices through the printing device connectivity manager, specifically through the printing connectivity modules. According to the disclosed embodiments, there is no need to modify the DFE system software as the printing connectivity modules may be installed even after deployment to all the DFE system to print to new or previously unsupported printing device or other devices within the printing system.

In some embodiments, a DFE system may have a terminal or a website where the DFE system can be monitored or managed. A suite of applications may be on the same terminal or on a separate computer that can communicate with the DFE system via TCP/IP or other networking protocols for monitoring print jobs, data, networking status, and the like. Such terminal, web services, and suite of applications are developed closely together for seamless connectivity, job monitoring, and job management. The firmware components and applications are usually developed and released together during the initial release as well as in subsequent upgrade versions. If an application is developed independently without affecting the DFE software or firmware, or without requiring modifications to the DFE software or firmware, that is possible through web services.

In a system with a DFE printing device connectivity manager, the disclosed embodiments connect external or remote display devices where print jobs can be monitored, previewed, modified, edited, re-routed, managed, and displayed. In some embodiments, these features may be achieved through the built-in terminal on the server or a computer where the DFE system resides. Alternatively, a web server on the DFE allows administrators and operators to monitor, preview, modify, edit, or manage the DFE itself or the print jobs submitted thereto. A web server and its applications may be accessed on a separate device by accessing its URL. In other words, the disclosed embodiments may include web services that can allow the operators to monitor job status, perform job management, or error management.

Web services may be event driven. Some events, for example such as a mouse click, gesture, or keyboard input may trigger a web page to be refreshed. Another feature also may be auto-refresh support but it is usually periodic, such as every few seconds, minutes, and the like.

According to the disclosed embodiments, the features address the need for displaying DFE processed page images, which are ready to print on paper, to preview or view on a display device. Ready-to-be-printed images may be streamed to at least one display device, particularly a remote device, with a performance that does not rely on web browser events or refresh limitations.

A print job to be processed through a DFE may undergo various stages of processing, as disclosed below. The stage of ripping may be the processing through the PDL interpreter. The stage of color conversion from a page ICC color profile, also known as a source ICC, provides an output intent ICC color profile, also known as a simulation profile. The stage of color conversion from output intent to paper ICC profile, also known as a destination profile, also is provided. Stages also include rotation, scaling, image manipulation, and halftoning.

At each of these various stages, the disclosed embodiments address the need to allow for developers, technical support, product reviewers, or even graphical designers to check, verify, and understand how the page is. This feature allows everyone involved to validate correctness, accuracy, and reliability of all the DFE features and capabilities for processing any kind of print job.

To achieve this, the disclosed embodiments register and connect multiple display devices, where each display will serve as a virtual printing device that is added to the DFE printing device connectivity manager. The virtual printing device is like a printing device but instead of rendering to a paper media, the pages are rendered to a display, such as the screen of a tablet, computer, or television. There may be varied display devices as even mobile phones, mobile projectors, and the like, can be treated as a display device.

In addition to the DFE components defined by the DFE printing device connectivity manager, the disclosed embodiments also implement the DFE display device connectivity manager within the printing device connectivity manager. The DFE display device connectivity manager includes display connectivity APIs and display connectivity modules. The DFE display device connectivity manager may be a new DFE component that operates within the printing device connectivity manager. It allows the DFE to be able to connect to and stream page images processed through the DFE to connected, and registered, display devices.

The two main components disclosed below includes display connectivity APIs and a display connectivity module. The display connectivity APIs include pre-defined interface functions for registering display devices, buffering of processed page image data, transmitting the data to connected display device as well as interactivity and print job handling. A display connectivity module may be an installable plug-in that can be development independently of the DFE system and the printing device connectivity manager. This feature allows for actual connectivity with external or remote display devices via any networking or communications technology, such as TCP/IP, HDMI, Wi-fi, Bluetooth, serial, and the like. There may be multiple display connectivity modules installed to enable previewing or print job monitoring in multiple display devices.

The display connectivity APIs enable connectivity and interactivity with display devices connected to the DFE. The APIs include display register, display connect, display status, display stream, display retrieved data, display retrieved configuration, display set up configuration, display disconnect, and display unregistered. These example APIs may be subject to addition, redefinition, or modification. The data exchanged through these APIs may be in varying formats, as necessary, such as video formats avi, mpeg/mp4, move, wmv, webm, mkv, fly, qt, and others, that may be a built-in format on the display device. Other formats also may be used.

A display connectivity module may be an installable plug-in in the DFE, particularly with the DFE printing device connectivity manager. It may provide the actual connectivity or communication platform to physical, external, or remote display devices such as tablets, computer monitors, smartphones, computers, televisions, projectors, and the like. Each plug-in display connectivity module supports connectivity to at least one registered display device vie current connectivity methods such as direct USB connection, Bluetooth™, Wi-Fi, Ethernet, serial ports, HDMI, RCE, and the like. A display connectivity module also may be developed for any display device connectivity technology applicable according to the disclosed embodiments.

Each display connectivity module may be developed as a DLL or other format that can be detected, loaded, and interacted with by the printing connectivity manager or the DFE system itself. It also is possible that a configuration be included with the display connectivity module files that can be used by the DFE system or printing device connectivity manager in order to install, integrate, and activate the use of the display connectivity module in the system. In another embodiment, a standard installation program may be provided to integrate, configure, and activate the use of the plug-in in the DFE system.

There may be two variations of a display connectivity module. One may be the simple connectivity module. The display device of this type of module registers into the system as regular display devices such as a television, computer monitor, picture frame, or other devices that mainly are used for viewing video or displaying pictures. Connectivity to such devices may be limited to display technologies such as HDMI, RCA, coax cable, VGA, and the like.

Another variation of the display connectivity module is a smart connectivity module. The display device of this type of module registers into the system as smart devices, such as computers, tablets, or smartphones/devices. Connectivity to such smart devices may not be limited to video. The connection may be through TCP/IP, Wi-fi, or other networking technologies. A software system service, driver, or application in the smart device may be developed to receive the data and signals from the printing device connectivity manager or the display connectivity manager, such as the page image, that is then displayed in the smart device display panel.

A DFE workflow using a display connectivity system may be as follows. The DFE software detects printing devices through the printing device connectivity manager. The printing device connectivity manager provides a list of printing devices detected or obtained through the installed printing device connectivity modules. The DFE allows the administrator or operator to select a printing device through which to interact. The DFE notifies the printing device connectivity manager about the selected printing device.

The DFE uses the printing device connectivity APIs to interact, retrieve data, or send data with the selected printing device. The printing device connectivity manager selects which stages of DFE processing will provide a viewable page image. The printing device connectivity manager retrieves and receives the viewable page image from the DFE system. The display connectivity manager receives the viewable page image from the printing device connectivity manager.

The display device connectivity manager selects activated display connectivity modules. The display device connectivity manager relays the viewable page image data to active display connectivity modules. The display connectivity modules transmit the viewable page image data to connected display devices. In one embodiment, the display connectivity modules continually transmit the viewable page image data to the connected display devices. In another embodiment, the display connectivity modules wait for signals from connected display devices for their respective readiness to receive the new viewable page image data. This feature may be more applicable to smart display connectivity modules.

In some embodiments, the display device connectivity manager is a standalone plug-in feature for DFE systems that do not necessarily have to interact with a printing device connectivity manager.

Connected devices may be distant or remote devices that can aid technical support, managers, operators, and customers in monitoring their DFE print jobs, manage print jobs, diagnose and printing errors, check for correctness of settings and configuration, evaluate print quality, and the like. In some embodiments, other data aside from viewable page image data may be transmitted to connected display devices. It also is possible to transmit diagnostic data, core dumps, configuration data, maintenance data, and other such data that may be desired to be viewed remotely or externally at real-time, at certain stages of the DFE processing of print jobs.

In other embodiments, the display device connectivity manager may be configured to transmit data at any time, time period, scheduled or random. The scheduled transmission of data may serve as a tool for monitoring print quality, consistency, monitoring print job progress, diagnostics, and the like. Random transmission of data may serve as a tool for diagnostics, random checks of print quality, a security check, a reliability check, and the like. In another embodiment, the printing device connectivity manager can periodically or randomly perform quality or calibration checks that can be sent to printing devices or display devices for auto-recalibration, diagnostics, quality checks, and the like.

The disclosed embodiments enable a new tool that helps technical support, especially for customers whose location of their DFE systems are distant or remote. The device connectivity modules may be developed independently of the DFE printing device connectivity manager as long as they provide and implement the corresponding and required device connectivity APIs. This feature will save development time of DFE systems as connectivity to display devices is not tied to development of the DFE system itself. This feature also will greatly aid in the development of DFE systems as developers can monitor data at various processing stages in the DFE system.

The disclosed embodiments also allow display devices to serve as virtual print engines. The development of DFE systems will be enhanced as the virtual engines can be thought of as simulations of the printing device engines. This feature will save printing to paper if developers can view, preview, and monitor the processing of print jobs through the display devices. Further, the disclosed embodiments provide the feature of allowing for the possibility to connect new display devices not yet available.

Current DFE systems also process print jobs with a lot of pages, in the hundreds or thousands of pages. Other print jobs may be documents with a fewer number of pages, but such print jobs are printed in multiple copies in the hundreds or thousands. The processing of such big print jobs requires an unusual amount of storage space on RAM and disk on the DFE computer system, especially considering production print jobs have complex, graphics-heavy, and variable-data heavy pages. Computer systems may have at least one SSD, flash memory drive, or HDD in the system that can help ensure that the DFE system is capable of processing very complex and large print jobs.

An issue with this configuration is that the computer system is still limited to its hardware enclosure. DFE systems may run on a single computer. Thus, the computer may be limited to how many hard drives or SSDs that can be installed on such a computer. Even leveraging the use of plugged USB drives are limited to the number of USB ports. The computer system would be burdened with too many plugged USB drives, which would defeat the purpose of having a DFE system. DFE systems are implemented to provide increased processing speed for production printing.

The disclosed embodiments provide a DFE storage connectivity system that is in addition to the DFE printing device connectivity system. The DFE storage connectivity system includes a storage connectivity manager that has storage connectivity APIs and storage connectivity modules. The storage connectivity manager may operate within the printing device connectivity manager. It allows the DFE to extend storage for the DFE system.

As noted above, the two main components of the storage connectivity manager, or DFE storage connectivity system, are the storage connectivity APIs and one or more storage connectivity modules. The storage connectivity APIs include pre-defined interface functions (APIs) for registering storage devices, buffering of print jobs, buffering of print data, buffering intermediate processed page data, and the transmission of such data to connected storage devices. A storage connectivity module may be an installable plug-in that can be developed independently of the DFE system and of the printing device connectivity manager. This module allows for actual connectivity with external or remote storage devices via any networking or communication technology such as TCP/IP, HDMN, Wi-fi, Bluetooth™, serial, and the like. Multiple storage connectivity modules may be installed to enable storing of data to external or remote storage devices.

The pre-defined storage connectivity APIs enable connectivity and interactivity with storage devices. The storage connectivity APIs include storage register, storage connect, storage status, storage stream, storage retrieve data, storage retrieve configuration, storage set configuration, storage disconnect, and storage unregister. These may be example interface functions that are subject to addition, redefinition, or modification. The data exchanged through these APIs may be in varying formats, as necessary, such as raw raster page image, diagnostics data, print job processing data, configuration data, color conversion data, such as look-up tables, cache data, and the like.

A storage connectivity module may be an installable plug-in in the DFE, particularly with the printing device connectivity manager. The storage connectivity module provides the actual connectivity or communication platform to actual physical, external, or remote storage devices such as network storage, shared folders, cloud storage, and the like. Each plug-in storage connectivity module supports connectivity to at least one registered storage device via current connectivity methods, such as direct USC connection, Bluetooth™, Wi-fi, Ethernet, and the like A storage connectivity module also may be developed for any storage device connectivity technology.

Each storage connectivity module may be developed as a DLL or other format that can be detected, loaded, and interacted with by the printing device connectivity system or by the DFE system itself. It also may be possible that a configuration be included with the storage connectivity module files that may be used by the DFE system or the printing device connectivity manager in order to install, integrate, and activate the use of the storage connectivity module in the system. In another embodiment, a standard installation program may be provided to integrate, configure, and activate the use of the plug-in within the DFE system.

There may be two variations or types of a storage connectivity module. One type may be a simple storage connectivity module. The storage device of this type of module registers into the system as basic storage devices, such as network drives, external drives, or smart shared network storage. These devices may be connected using a USB port, Wi-fi, Ethernet, or TCP/IP.

Another type of the storage connectivity module is a smart storage connectivity module. The storage device of this type registers into the system as smart devices, such as computers, servers, or cloud services. These devices may be connected through TCP/IP or other networking protocols. A software system service, driver, or application in the smart device may be developed to receive the data and signals from the printing device connectivity manager or the display device connectivity system, such as page image, diagnostics data, processing data, color conversion data, and the like. Data may be transmitted and stored in the storage installed in the smart device, such as a computer hard drive, SSD, and the like.

An example DFE workflow with a storage connectivity system may operate as follows. The DFE software detects printing devices through the printing device connectivity manager. The printing device connectivity manager provides a list of printing devices detected or obtained through the installed printing connectivity modules. The DFE allows an administrator, operator, customer, and the like to select a printing device with which to interact. The DFE notifies the printing device connectivity manager about the selected printing device.

The DFE uses printing device connectivity APIs to interact, retrieve data, or send data with the selected printing device. Printing device connectivity manager selects which stages of DFE processing need to store data. The DFE uses the storage connectivity APIs to send storable data at various points in the printing process. For example, storable data may be sent when detecting low free space availability in the DFE system. The DFE system can call an API to send low-priority data to external or remote storage via the storage connectivity APIs. The printing device connectivity manager retrieves and receives storable data from the DFE system.

The storage connectivity manager receives storable data from the printing device connectivity manager or the DFE system itself. The storage connectivity manager selects activated storage connectivity modules. The storage connectivity manager relays storable data to active storage connectivity modules that report free space. Processes may be developed to select the best usage of reported available storage space in all connected storage devices. The processes, for example, may be first-come-first-use, most-free-space-first, the fastest storage device first, and the like. The storage connectivity module transmits the storable data to the connected storage device or devices.

In some embodiments, the storage connectivity manager is developed as a standalone plug-in feature for the DFE system that does not necessarily have a printing device connectivity manager. Connected storage devices may be distant and remote devices that can serve as additional storage to be used by the DFE system. This feature will provide unlimited storage to a DFE system, relieving the limitations of a computer chassis or hardware enclosure.

The storage connectivity modules may be developed independently of the printing device connectivity manager as long as they provide and implement the corresponding and required storage connectivity APIs. This feature will allow the DFE system to have unlimited storage space for any print job that it may receive throughout the lifetime of its hardware components. As drive space is needed, additional storage can be registered, integrated, and activated using storage connectivity modules. Customers of DFE systems can start with a basic storage configuration, and can upgrade their storage capacity by integrating the storage connectivity system.

The disclosed embodiments allow the developers and manufacturers of DFE systems to develop new capabilities into the DFE systems, such as storing print jobs for a longer time or even indefinitely. This feature may allow for storing of pre-rendered images that will greatly improve performance of re-printing previously processed, color converted, halftoned images. The reprinting of such pre-rendered images will save time on RIP operations, color conversion time, halftoning, and other DFE processing. The pre-rendered images are sent and processed directly in the production printing devices. The disclosed embodiments allow the DFE system to connect to new storage devices having new technology.

FIG. 1A depicts a printing system 100 for printing documents according to the disclosed embodiments. Printing system 100 includes DFE system 106. DFE system 106 is connected to printing devices 102, 104, 108, and 110. DFE system 106 may receive one or more print jobs 103, convert the print job to a file format useable at a printing device, and then forward the print job to the selected printing device. One advantage of this configuration is that processing of print jobs may be offloaded to DFE system 106 to keep resources at the printing devices from being tied up with complex computer operations. DFE system 106 may use graphic processing units to enable more complex processing and translation of print jobs. Further, an update to print processing software or firmware may occur at DFE system 106 as opposed to each printing device within printing system 100, thereby making upgrades easier and less time consuming.

DFE system 106 includes connection module 118 to printing device D 102. Connection module 118 includes information on how DFE system 106 communicates with the printing device firmware in printing device D 102. Connection module 118 may use conventional features to achieve this connection and to send print jobs to printing device D 102. Connection 140 connects printing device D 102 with connection module 118.

DFE system 106 also includes printing device connectivity manager 120. The features of printing device connectivity manager 120 are disclosed above. Printing device connectivity manager 120 provides connectivity to printing devices using plug-in modules that may be installed on-demand. When installed, DFE system 106 may interact with the connected or coupled printing devices using printing device connectivity manager 120.

Printing device connectivity manager 120 includes printing connectivity modules 124, 128, and 132. Printing connectivity modules include the features disclosed above. Each printing connectivity module is connected or coupled to a printing device. Thus, printing connectivity module A 124 is connected using connection 142 to printing device A 104. Printing connectivity module B 128 is connected using connection 144 to printing device B 108. Printing connectivity module C 132 is connected using connection 146 to printing device C 110. Printing system 100 may implement connections 142-146 via network programming using TCP/IP or network sockets. Connections 142-146 also may implement technologies such as a direct universal serial bus (USB) connection, a parallel port, Bluetooth™, NFC, direct wi-fi, direct local area network (LAN) connectivity and the like. These communication channels may not be standard for printing operations but are made available for printing according to the disclosed embodiments.

When DFE system 106 wants to communicate with a specific printing device, it uses printing device connectivity manager 120 to determine which corresponding printing connectivity module to use. For example, if print job 103 is meant for printing device B 108, then DFE system 106 will use printing connectivity module B 128 to interact with printing device B 108. Printing connectivity module B 128 also may retrieve information from printing device B 108 when requested by DFE system 106.

Printing connectivity modules of printing device connectivity manager 120 may be installable plug-ins that allow connectivity with printing devices. Printing connectivity modules even may replace hardwired connectivity support, such as connection 118, for legacy printing devices. A printing connectivity module is implemented using printing connectivity APIs. Printing connectivity APIs provide standard or pre-defined interfaces for managing, handling, and transmitting information and data between the printing connectivity modules and the printing devices. Printing connectivity APIs are disclosed in greater detail below.

Each printing connectivity module implements its own plurality of APIs. Thus, printing connectivity module A 124 implements and provides APIs X 122. Printing connectivity module B 128 implements and provides APIs Y 126. Printing connectivity module C 132 implements and provides APIs Z 130. APIs X 122 provide the functionality for printing connectivity module A 124 to communicate with printing device A 104. APIs Y 126 provide the functionality for printing connectivity module B 128 to communicate with printing device B 108. APIs Z 130 provide the functionality for printing connectivity module C 132 to communicate with printing device C 110.

According to the disclosed embodiments, the printing connectivity modules may communicate directly to application modules at the respective printing devices. Use of application modules allow DFE system 106 to bypass the DFE of the printing device and provide translated print jobs 103 to the print engine of the printing device. This feature helps to offload processing from the printing devices to DFE system 106.

Thus, as shown in FIG. 1A, printing device A 104 includes application module 112. Application module 112 is configured to communicate directly with printing connectivity module A 124 of printing device connectivity manager 120. Application module 112 also may provide files for printing directly to print engine 260 of printing device A 104. As the files for print jobs 103 are provided already converted into a file format ready for printing, the disclosed embodiments may provide the print job directly to the print engine for printing. Printing device B 108 includes application module 114 that communicates with printing connectivity module B 128 to receive print jobs 103 for print engine 116 of printing device B 108. Printing device C 110 also may include an application module and a print engine even though these features are not shown.

Using printing device connectivity manager 120, DFE system 106 may communicate directly with printing devices within printing system 100. Additional printing connectivity modules may be added to printing device connectivity manager 120 as printing devices are added to printing system 100. Printing device connectivity manager 120 creates the printing connectivity module using the associated APIs. DFE software does not need to be modified. Further, printing connectivity modules may be removed if a printing device is removed.

Printing system 100 also may include a display device 150. Display device 150 may be a computer, tablet, smartphone, kiosk, display screen, and the like that allows a user to review a print job prior to sending it to a selected printing device. Printing device connectivity manager 120 may forward the converted print job to display device 150, where it is displayed on a screen for an operator to review. This feature may allow the operator to review and check the print job prior to printing operations. This feature also is different from a "print preview" feature available using print drivers. The data within the document to be printed has not yet been rendered. Display device 150 is connected to printing device connectivity manager 120 by connection 148. In some embodiments, display device 150 may be with a printing device. In other embodiments, it is a separate device such that the operator does not need to be in the print shop to review.

DFE system 106 may implement graphics processing units, or graphics cards, to process print jobs prior to them being sent to the printing devices. DFE system 106 provides good color matching capabilities on consistent basis. Using the printing connectivity modules, DFE system 106 may provide print jobs directly to the print engines of the printing devices. Further, DFE system 106 may retrieve data from printing devices using the printing connectivity modules, such as ink use, tray usage, configuration settings, and the like. The APIs of the printing connectivity modules import information to enable direct translation of print jobs.

Figure 1B:
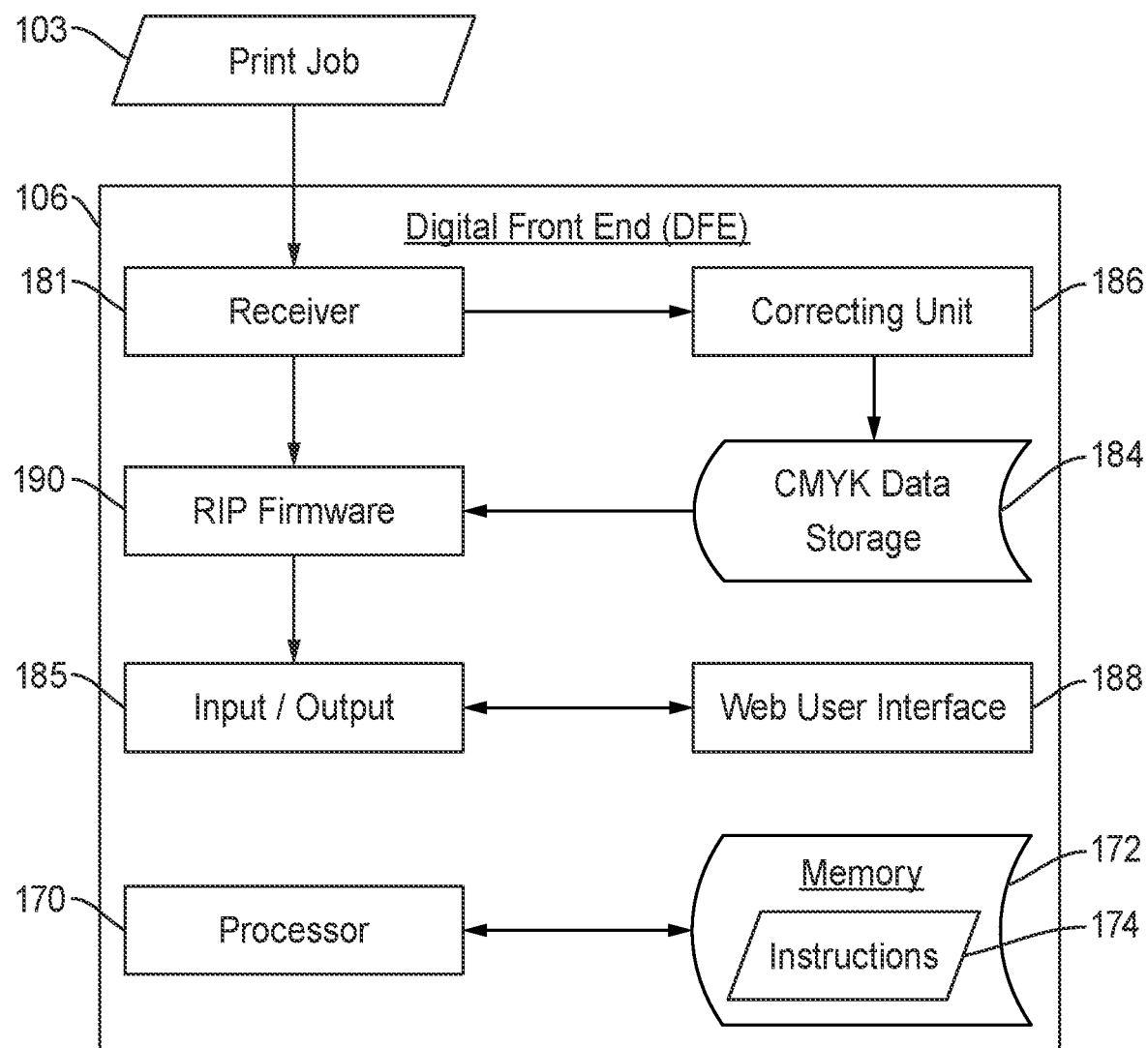
FIG. 1B illustrates a digital front end (DFE) for a printing device according to the disclosed embodiments.

FIG. 1B depicts a block diagram of DFE system 106 according to the disclosed embodiments. DFE system 106 includes a receiver 181, a RIP firmware 190, a CMYK data storage 184, an input/output connector 185, and a correcting unit 186. Additional components within DFE system 106 may be implemented, including printing device connectivity manager 120 disclosed in FIG. 1A.

Receiver 181 receives print job 103 received within system 100 and outputs the print job to RIP firmware 190. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 190 converts image data associated with the print job into raster data to thereby generate rendering data, and outputs the generated rendering data. RIP firmware 190 also converts the rendering data into rendering data in a CMYK format. When the rendering data is originally in the CMYK format, or CMYK rendering data, the conversion may not be performed. RIP firmware 190 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 190 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE system 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE system 106.

DFE system 106 also includes one or more processors 170. Processors 170 may execute code in the form of instructions 174 stored in memory 172 connected to the one or more processors. As disclosed above, processors 170 may be computer processing units (CPUs) or graphics processing units (GPUs). Processors 170 may be scalable in that DFE system 106 may increase its processing capabilities to meet increasing demands within printing system 100. Instructions 174 configure DFE system 106 to perform various tasks related to creation and implementing printing device connectivity manager 120. For example, instructions 174 may instruct processors 170 to dedicates a processor to perform the functions of printing device connectivity manager 120.

Figure 2:
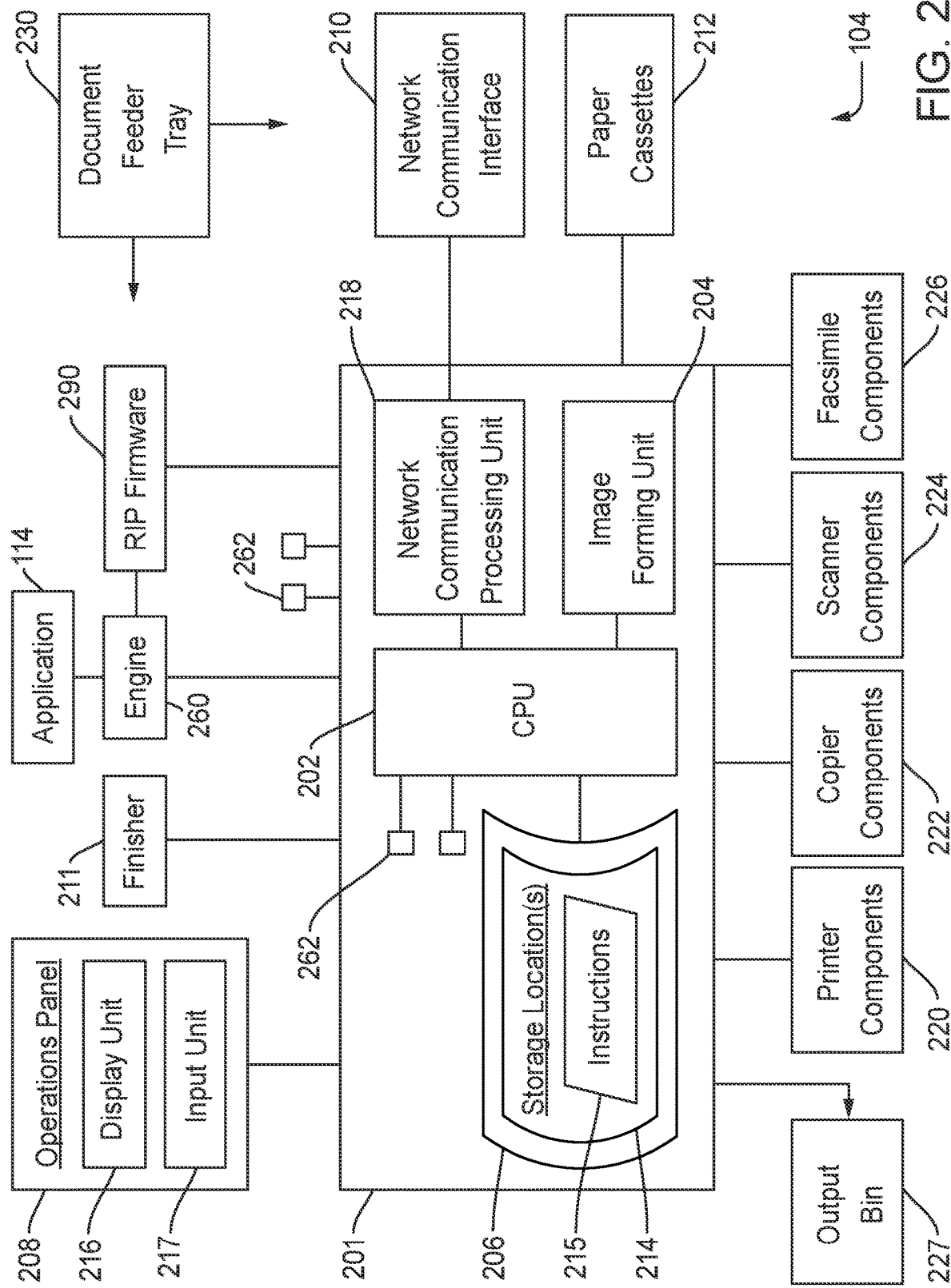
FIG. 2 illustrates a block diagram of components of the printing device for use within the printing system according to the disclosed embodiments.

FIG. 2 depicts a block diagram of components of printing device A, or just printing device, 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device A 104 may send and receive data from DFE system 106 using printing connectivity module A 124, if a separate device, and other devices within system 100.

Printing device A 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device A 104, using computing platform 201, may be configured to perform various operations, such as scanning, copying, printing, receiving or sending a facsimile, or document processing. As such, printing device A 104 may be a printing device or a multi-function peripheral including a scanner, and one or more functions of a copier, a facsimile device, and a printer. To provide these functions, printing device A 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device A 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device A 104. The information for printing these papers may be captured in a paper catalog stored at DFE system 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device A 104 to receive papers and documents to be processed. Feeder tray also may refer to one or more input trays for printing device A 104. A document is placed on or in document processor input feeder tray 230, which moves the document to other components within printing device A 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device A 104. For example, a storage location 214 may include data for running an operating system executed by computing platform 201 to support the components within printing device A 104. According to the disclosed embodiments, memory unit 206 may store the tokens and codes used in performing the deferral operations for printing device A 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device A 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device A 104.

Display unit 216 also may serve as to display results from DFE system 106, if applicable. DFE system 106 may send calibration and paper catalog information to printing device A 104 for display. For example, the operator at DFE system 106 may send a calibration to printing device A 104. Printing device A 104 displays paper type and any other information needed to complete the calibration.

Printing device A 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device A 104.

Printing device A 104 also includes print engine 260, as disclosed above. Engine 260 may be a combination of hardware, firmware, or software components that accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device A 104.

Printing device A 104 may include one or more sensors 262 that collect data and information to provide to computing platform 201 or CPU 202. Each sensor 262 may be used to monitor certain operating conditions of printing device A 104. Sensors 262 may be used to indicate a location of a paper jam, failure of hardware or software components, broken parts, operating system problems, document missfeed, toner level, as well as other operating conditions. Sensors 262 also may detect the number of pages printed or processed by printing device A 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device A 104 communicates with other devices within system 100 via network communication interface 210 by utilizing a network protocol, such as the ones listed above. In some embodiments, printing device A 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device A 104 submits and receives data from DFE system 106 as well as other devices within system 100.

Figure 3:
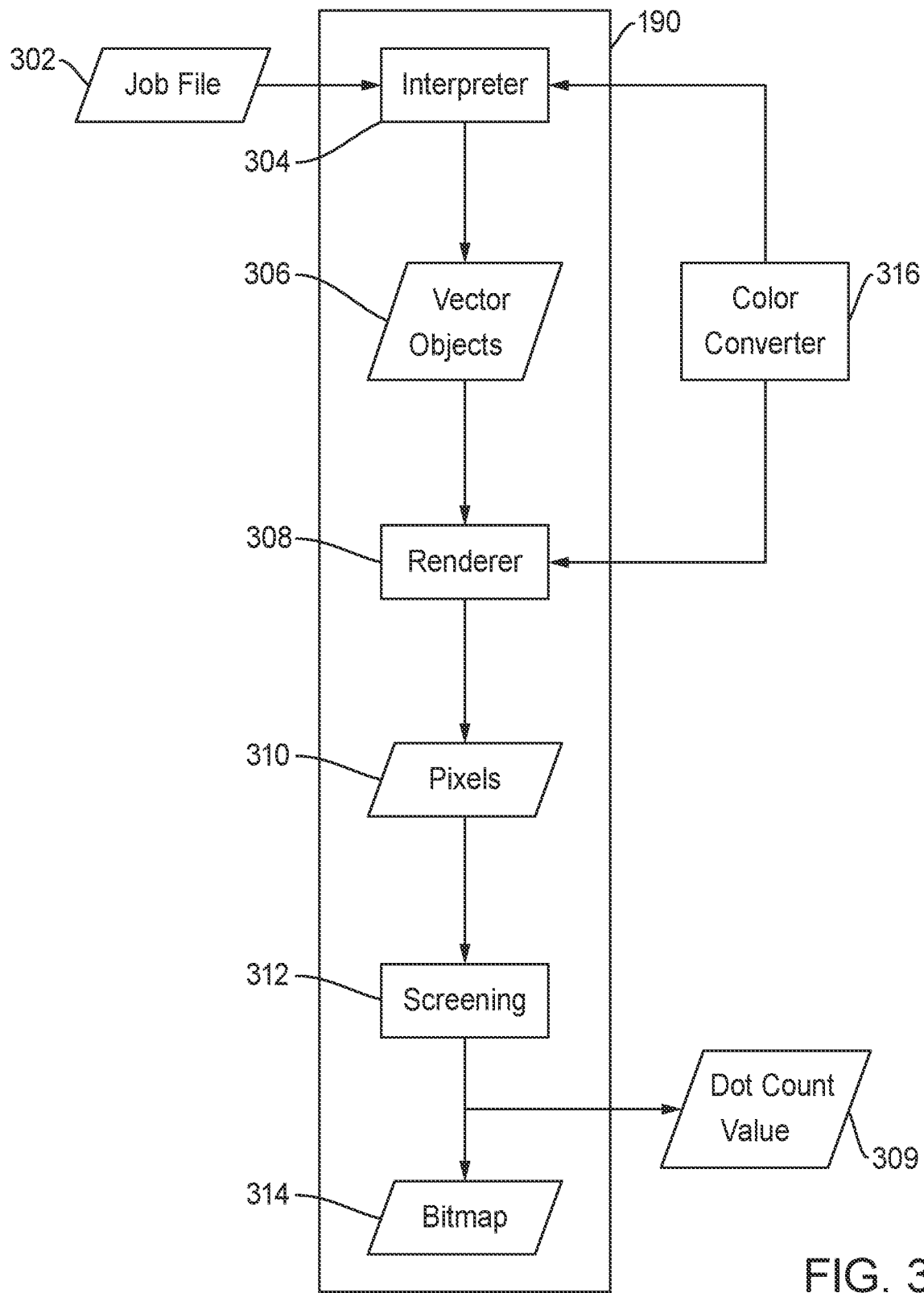
FIG. 3 illustrates a block diagram of the RIP firmware used within the DFE system according to the disclosed embodiments.

FIG. 3 depicts a block diagram of RIP firmware 190 used within DFE system 106 according to the disclosed embodiments. RIP firmware 190 converts text and image data from different file formats including PDF, TIFF, or JPEG into a format that the printing devices can understand. The process of raster image processing a page implements several steps to be performed, regardless whether the page is submitted as PostScript, PDF, or any other page description language (PDL). In short, RIP firmware 190 may provide interpretation, rasterization, and screening.

Job file 302 may be a job file associated with print job 103. Job file 302 may be a PostScript file in code. Job file 302 may be provided to RIP firmware 190 in DFE system 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by a print engine at a printing device, such print engine 260 of printing device A 104.

RIP firmware 190 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 190 may have a software version or other identification associated with it that distinguishes this version from others in system 100. DFE system 106 may implement several different RIP firmware versions depending on the type of print job 103. Further, different printing devices may implement different versions of the RIP firmware. Preferably, RIP firmware 190 is software implemented.

The disclosed embodiments also may determine dot count value 309 from the rendered image provided by renderer 308. Dot count values may be adjusted based on screening 312 and based on settings at the selected printing device, as provided via the corresponding printing connectivity module. Dot count value 309 may be used by DFE system 106 to provide ink use estimates and other information.

The rendered document, or bitmap 314, may be sent, for example, to print engine 260 via application module 114. Bitmap 314 is in a file format acceptable for the selected printing device. DFE system 106 may apply a formula to dot count value 309 along with applicable settings to determine consumable use. Further, the disclosed embodiments may use this information to use a single consumable use estimate with a variety of job settings, DFE configuration settings, or printing device configuration settings. Dot count value 309 should not change once determined from the rendered document from RIP firmware 190. Engine specific settings, such as halftones, however, will impact consumable use at print engine 260, and may differ over time at printing device A 104 or at another printing device within system 100.

RIP firmware 190 may be one of several RIPs implemented by DFE system 106. As different printing devices may implement different RIPs, DFE system 106 stores all associated RIPs to make them available for these processing operations. The printing connectivity modules may retrieve RIP versions from the connected printing devices. DFE system 106 also may retrieve color printing resources, such as TRCs, ICC profiles, and associated settings used for color printing at the respective printing device.

Figure 4:
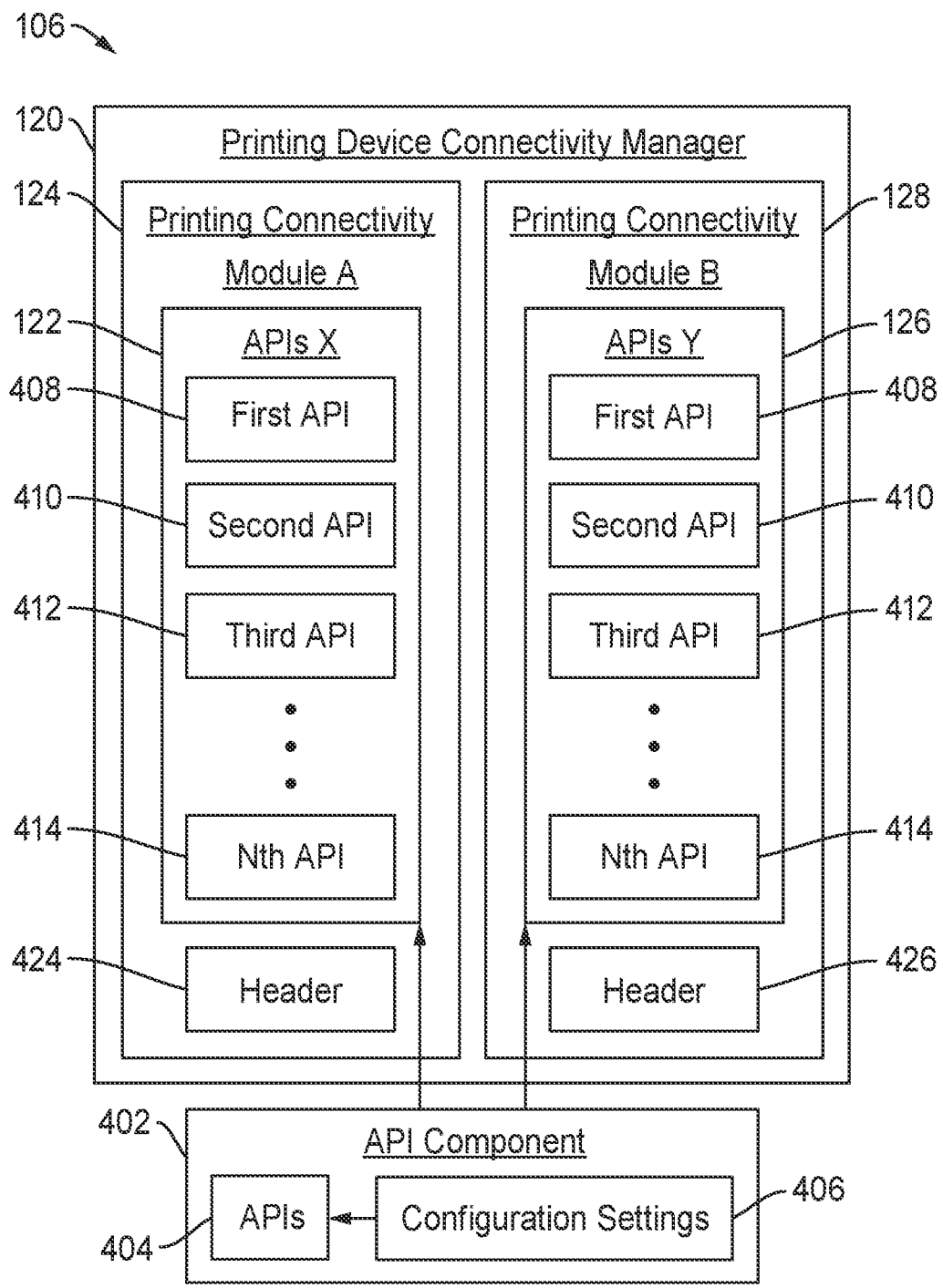
FIG. 4 illustrates a block diagram showing APIs being used to create printing connectivity modules within the printing device connectivity manager according to the disclosed embodiments.

FIG. 4 depicts a block diagram showing APIs being used to create printing connectivity modules within printing device connectivity manager 120 according to the disclosed embodiments. As disclosed above, a printing connectivity module uses the APIs defined in API component 402 to implement pre-defined or standard interface functions for handling, managing, and transmitting print jobs 103 to a selected printing device. API component 402 is a separate component having a plurality of APIs 404. API component 402 may be within printing device connectivity manager 120. Alternatively, API component 402 may be within DFE system 106.

Each printing connectivity module implements and provides the APIs identified in API component 402. This action may be performed when a printing connectivity module is created within printing device connectivity manager 120. The printing connectivity module includes a dynamic link library or module that is loaded at run-time in DFE system 106. The DLL may contain code and data that is used by more than one printing connectivity module at the same time. This feature promotes API reuse and efficient memory usage.

For example, when printing connectivity module A 124 is created, it will load APIs X 122 from API component 402. A plurality of APIs may be loaded to printing connectivity module A 124. Thus, printing connectivity module A 124 implements first API 408, second API 410, third API 412, up to Nth API 414. Printing connectivity module B 128 also loads APIs Y 126 using the same process. Thus, printing connectivity module B 128 implements first API 408, second API 410, third API 412, up to Nth API 414 as well. As disclosed above, any number of APIs may be implemented by the printing connectivity modules.

In some embodiments, configuration settings 406 of the different printing devices may be stored at DFE system 106. Configuration settings 406 may be used to provide additional data along with the APIs provided to the specific printing connectivity modules to tailor the APIs to the printing device. Alternatively, configuration settings 406 may be provided to each printing connectivity module based on which printing device is connected thereto.

Each printing connectivity module may include a header file to facilitate integration of the module within DFE module 106. The header file may be a file that contains function declarations and macro definitions to be shared between several source files. Thus, printing connectivity module A 124 may include header file 424 and printing connectivity module B 128 may include header file 426. In some embodiments, the printing connectivity module may not need to have a header file as the printing connectivity module may be installed into printing device connectivity manager 120 using standard installer programs.

Figure 5:
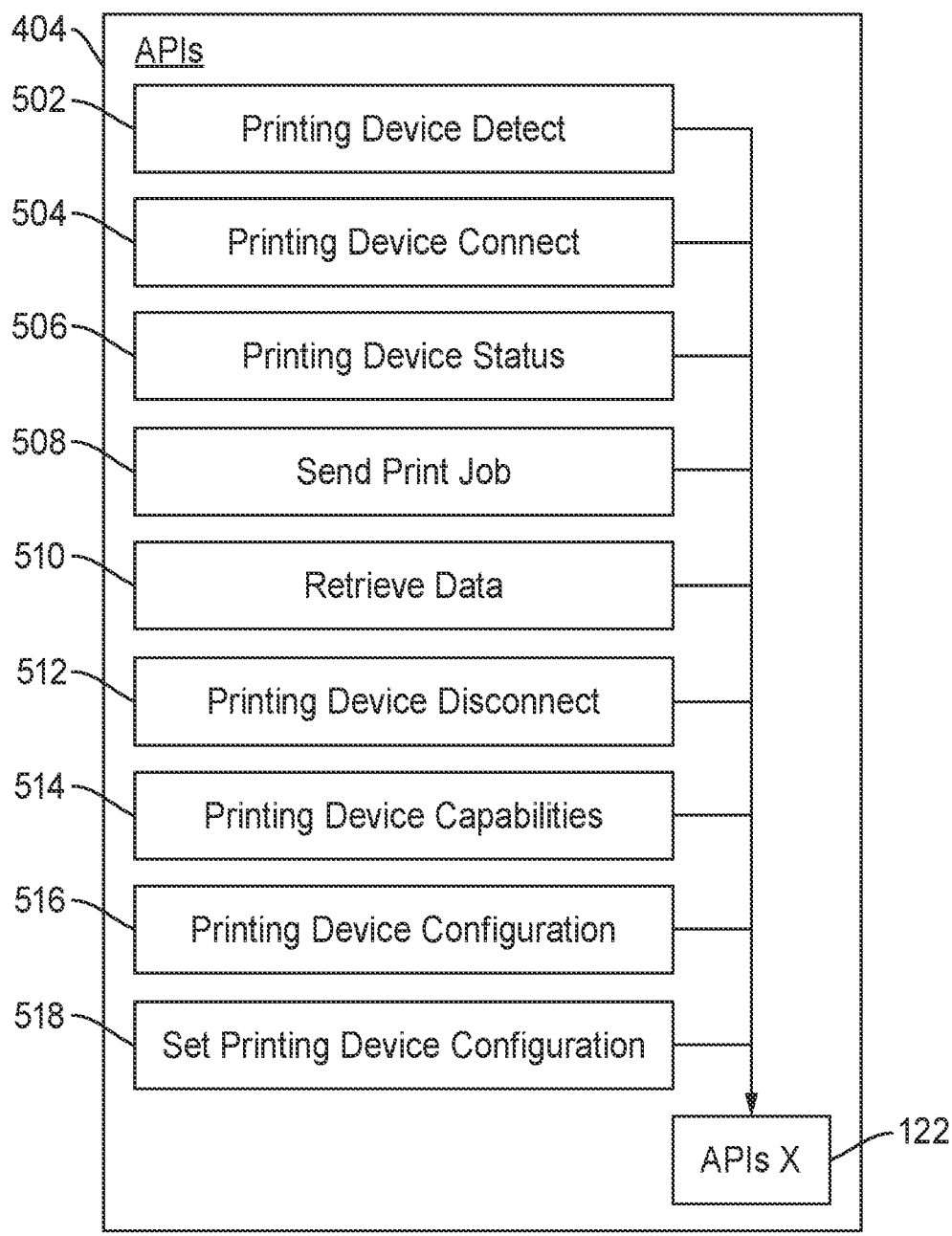
FIG. 5 illustrates a block diagram of a plurality of APIs for use within printing connectivity modules according to the disclosed embodiments.

FIG. 5 depicts a block diagram of a plurality of APIs 404 for use within printing connectivity modules according to the disclosed embodiments. As disclosed above, printing connectivity APIs are implemented by the printing connectivity modules to provide the functionality in communicating with the printing devices connected with DFE system 106. APIs 404 may include pre-defined APIs that abstracts printing device communication and printing support for DFE system 106.

An application programming interface (API) provides the means for two or more computer programs, such as printing connectivity module A 124 and application module 112 of printing device A 104, to communicate with each other. Thus, APIs 404 connect DFE system 106 to the printing devices within printing system 100. An API specification may define how the APIs are to be used by the printing connectivity modules.

Referring to FIG. 5, examples of interface functions are disclosed. Other interfaces may be defined, identified, or added to APIs 404, as needed. Further, the data exchanged through APIs 404 may vary in format, as necessary, such as XJDF, XML, PDL (PCL5, PCL6, PDF, PostScript, Prescribe, and the like), PJL, and the like. DFE system 106 may add or remove an API from APIs 404 as needed to update the capabilities of the DFE system. This feature alleviates the need to update the software of DFE system 106.

Printing device detect API 502 may allow DFE system 106 to detect whether a printing device is connected or on-line within printing system 100. When implemented within a printing connectivity module, printing device detect API 502 may detect whether the connected printing device is connected or on-line. For example, printing connectivity module A 124 may use printing device detect API 502 to detect whether printing device A 104 is connected with DFE system 106.

Printing device connect API 504 allows DFE system 106 to establish a connection session with a printing device. When implemented within a printing connectivity module, printing device connect API 504 may establish a connection session between the printing connectivity module and the corresponding printing device, such as through the application module. For example, printing connectivity module A 124 may use printing device connect API 504 to establish a connection session with printing device A 104.

Printing device status API 506 allows DFE system 106 to detect or retrieve printing device status. When implemented within a printing connectivity module, printing device status API 506 detects and retrieves status for the connecting printing device. For example, printing connectivity module A 124 may use printing device status API 506 to detect and retrieve the status of printing device A 104.

Send print job API 508 allows DFE system 106 to send data for print job 103 to the printing device. When implemented within a printing connectivity module, send print job API 508 sends the data and information for print job 103 to a selected printing device. For example, printing connectivity module A 124 may use send print job API 508 to send data for print job 103 to printing device A 104.

Retrieve data API 510 allows DFE system 106 to retrieve data from the printing device. When implemented within a printing connectivity module, retrieve data API 510 retrieves data and information from the selected printing device. For example, printing connectivity module A 124 may use retrieve data API 510 to retrieve data and information from printing device A 104 for use within DFE system 106.

Printing device disconnect API 512 allows DFE system 106 to disconnect from a printing device. When implemented within a printing connectivity module, printing device disconnect API 512 disconnects from the selected printing device. For example, printing connectivity module A 124 may use printing device disconnect API 512 to disconnect from printing device A 104.

Printing device capabilities API 514 allows DFE system 106 to retrieve printing device capabilities or features. When implemented within a printing connectivity module, printing device capabilities API 514 retrieves capabilities and features, as well as functionality, from the selected printing device. For example, printing connectivity module A 124 may use printing device capabilities API 514 to retrieve capabilities and features from printing device A 104 via application module 112.

Printing device configuration API 516 allows DFE system 106 to retrieve configuration information or settings from the printing device. When implemented within a printing connectivity module, printing device configuration API 516 retrieves the configuration information or settings from the selected printing device. For example, printing connectivity module A 124 may use printing device configuration API 516 to retrieve configuration information or settings from printing device A 104.

Set printing device configuration API 518 allows DFE system 106 to make changes or updates to the configuration of the printing device. When implemented within a printing connectivity module, set printing device configuration API 518 allows one to make changes or updates to the configuration of the printing device. For example, printing connectivity module A 124 may use set printing configuration API 518 to make a change or an update to the configuration of the printing device.

These APIs may be used for first API 408, second API 410, third API 412, and so on up to Nth API 414. Other APIs also may be used. Standard APIs that exist without being pre-defined also may be used. As shown in FIG. 5, APIs 404 may be used to implement APIs X 122 for printing connectivity module 124.

Figure 6:
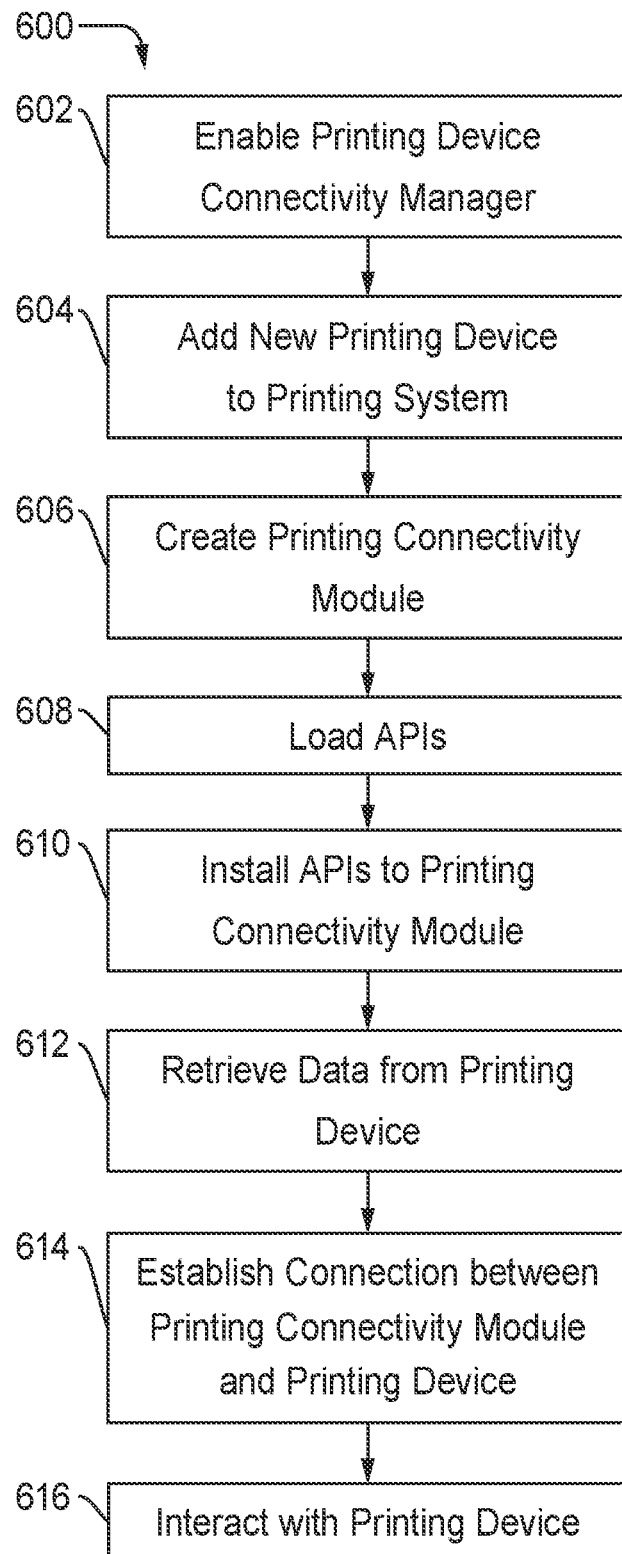
FIG. 6 illustrates a flowchart for creating and implementing a printing connectivity module within a printing device connectivity manager according to the disclosed embodiments.

FIG. 6 depicts a flowchart 600 for creating and implementing a printing connectivity module within printing device connectivity manager 120 according to the disclosed embodiments. Flowchart 600 may refer to FIGS. 1A-5 for illustrative purposes. Flowchart 600, however, is not limited by the embodiments disclosed by FIGS. 1A-5.

Step 602 executes by enabling printing device connectivity manager 120 at DFE system 106. DFE system 106 may install printing device connectivity manager 120 along with API component 402, which includes APIs 404 for use in communicating with printing devices. Printing device connectivity manager 120 allows DFE system 106 to dynamically interact with various devices within printing system 100. This component also maintains and manages the list of printing device connections and identifies the printing connectivity module in which to interact in communicating with a specific printing device.

Step 604 executes by adding a new printing device to printing system 100. The new printing device also connects with DFE system 106. For example, printing device B 108 may be added to printing system 100. Printing device A 104 and printing device D 102 already may be connected to DFE system 106. Step 606 executes by creating printing connectivity module B 128 in printing device connectivity manager 120. Printing connectivity module B 128 may be an installable plug-in component within printing device connectivity manager 120.

Step 608 executes by loading a plurality of APIs at printing device connectivity manager 120 to implement printing connectivity module B 128. The new printing connectivity module may call to API component 402 to retrieve or load APIs Y 126 from APIs 404. Step 610 executes by installing APIs Y 126 at printing connectivity module B 128. APIs Y 126 provide the interfaces within printing connectivity module B 128 to manage, handle, or transmit print job 103 within DFE system 106.

Step 612 executes by retrieving data and information from new printing device B 108. This data and information may include printing device capabilities, such as paper sizes, output tray parameters, color printing capabilities, and the like. Such information also may include model serial number and other device specific information as well as printing device settings. Step 614 executes by establishing connection 144 between printing connectivity module B 128 and printing device B 108. Printing device connectivity manager 120 may update its list of connected devices with this connection. Step 616 executes by interacting with printing device B 108 from DFE system 106 using printing connectivity module B 128. Such an interaction may include converting print job 103 into a translated print job for printing at printing device B 108 and sending the print job to the printing device.

Figure 7:
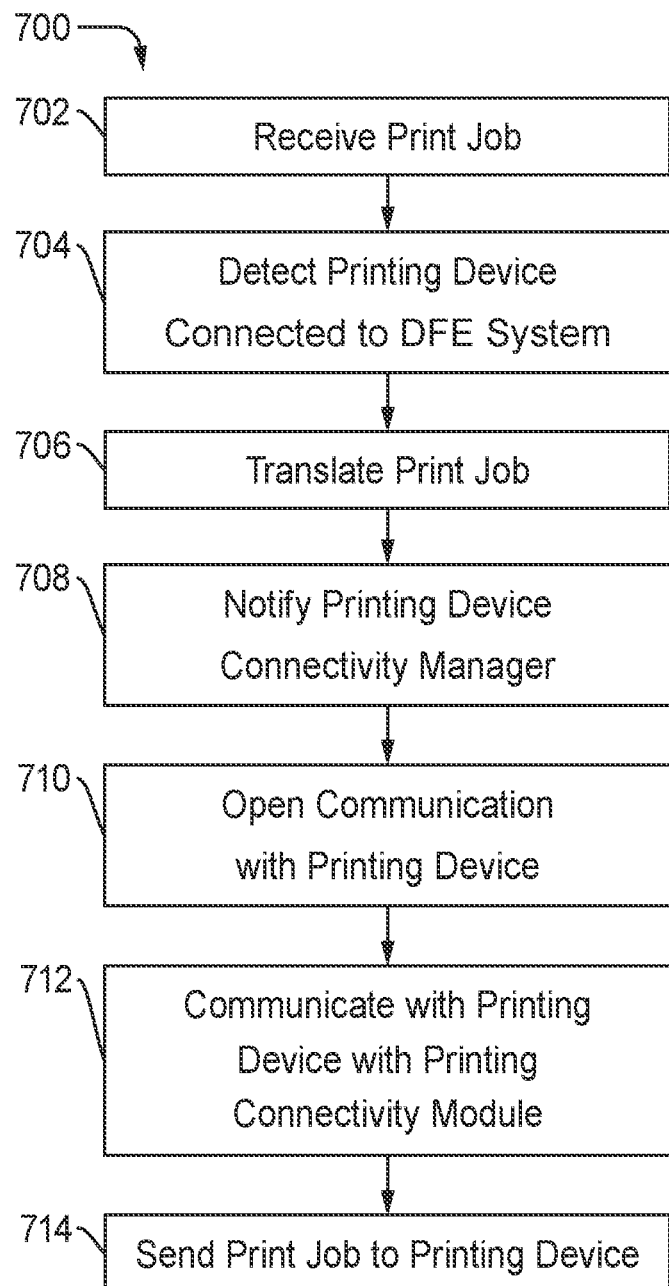
FIG. 7 illustrates a flowchart for managing workflow using the DFE system and the printing device connectivity manager according to the disclosed embodiments.

FIG. 7 depicts flowchart 700 for managing workflow using DFE system 106 and printing device connectivity manager 120 according to the disclosed embodiments. Flowchart 700 may refer to FIGS. 1A-6 for illustrative purposes. Flowchart 700, however, is not limited by the embodiments disclosed by FIGS. 1A-6.

Step 702 executes by receiving print job 103 at DFE system 106. Print job 103 may be submitted to printing system 100 for printing at a printing device within the system. Printing system 100 may instruct all print jobs to go to DFE system 106 to manage printing operations. Step 704 executes by detecting a printing device connected to DFE system 106 using printing device connectivity manager 120. For example, DFE system 106 may use printing device connectivity manager 120 to detect printing device A 104. Printing device A 104 is connected to DFE system 106. In some embodiments, an operator may specify which printing device is to receive print job 103 for printing. In other embodiments, DFE system 106 may analyze some attributes or metadata associated with print job 103 to determine which printing device is the best for completing the printing operations.

Step 706 executes by translating print job 103 within DFE system 106. DFE system 106 may use RIP firmware 190, as disclosed above. The translation may include converting print job 103 into a file format, or raster data format, that is acceptable to a selected printing device. The file format may be known for print engine 260 of printing device A 104. Step 708 executes by notifying printing device connectivity manager 120, by DFE system 106, to open communication with printing device A 104.

Step 710 executes by opening communication with printing device A 104 using corresponding printing connectivity module A 124. Printing device connectivity manager 120 determines according to its list or data that printing connectivity module A 124 is connected to printing device A 104 via connection 142. Step 712 executes by communicating with printing device A 104 with printing connectivity module A 124 using APIs X 122. APIs X 122 provide the interfaces to communicate directly with printing device A 104. In some embodiments, printing connectivity module A 124 communicates with application module 112 at printing device A 104.

Step 714 executes by sending translated print job 103 to printing device A 104 using one or more of APIs X 122 within printing connectivity module A 124. Thus, DFE system 106 does not require special software to communicate with printing device A 104. Instead, printing device connectivity manager 120 manages printing operations for DFE system 106.

Figure 8:
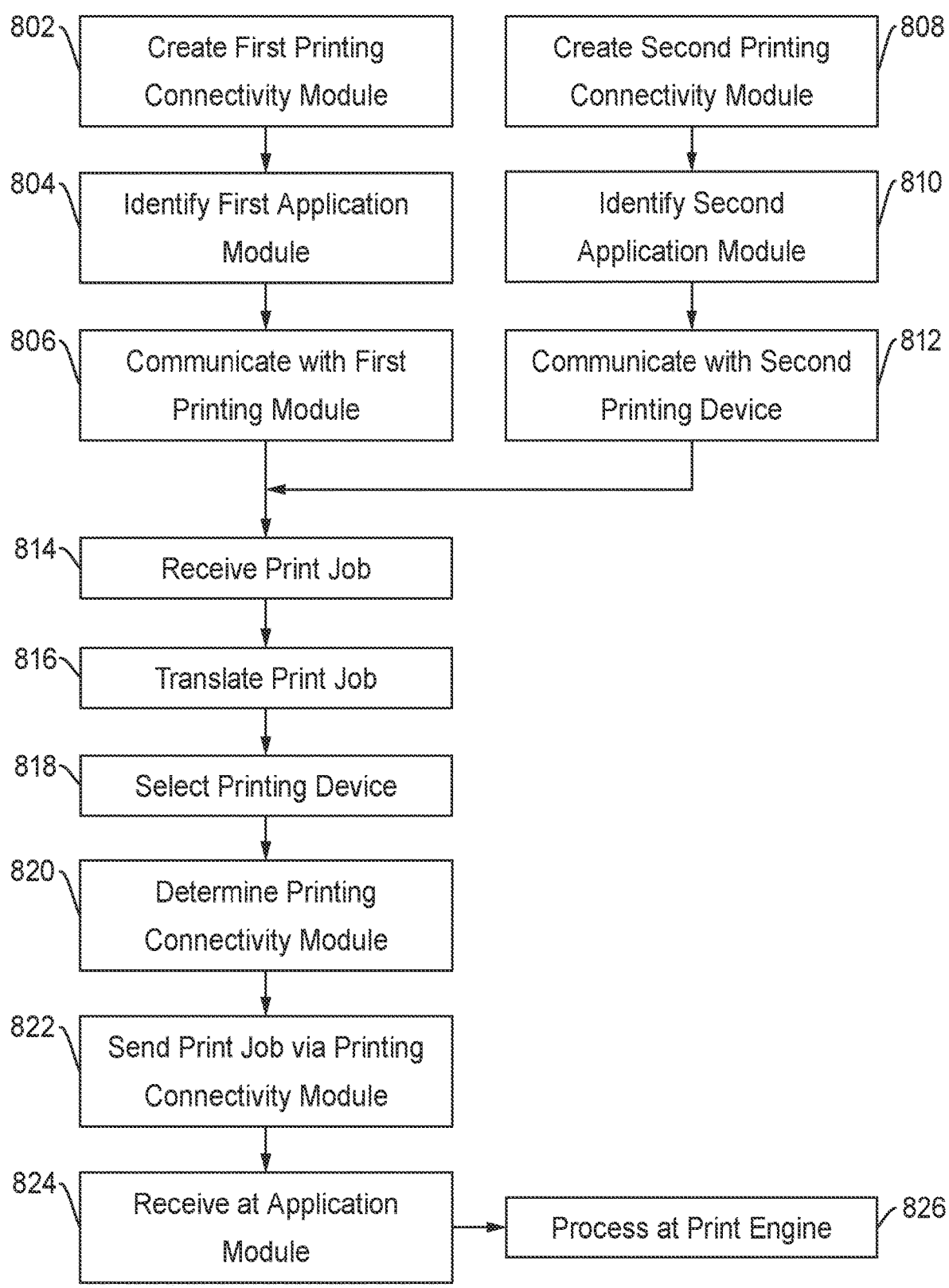
FIG. 8 illustrates a flowchart for managing printing operations within the printing system using the DFE system according to the disclosed embodiments.

FIG. 8 depicts a flowchart 800 for managing printing operations within printing system 100 using DFE system 106 according to the disclosed embodiments. Flowchart 800 may refer to FIGS. 1A-7 for illustrative purposes. Flowchart 800, however, is not limited by the embodiments disclosed by FIGS. 1A-7.

Step 802 executes by creating a first printing connectivity module. This step may be disclosed above by flowchart 600.

For example, printing connectivity module A 124 is created in printing device connectivity manager 120. Step 804 executes by identifying a first application module at the corresponding printing device to connect with the first printing connectivity module. In this instance, printing connectivity module A 124 identifies application module 112 of printing device A 104 to which to establish connection 142.

Step 806 executes by communicating with the first printing device over the connection between the first printing connectivity module and the first application module. In this instance, printing connectivity module A 124 communicates with application module 112 over connection 142 to interact with printing device A 104. Printing connectivity module A 124 may retrieve data about printing device A 104.

Step 808 executes by creating a second printing connectivity module. This step may be disclosed above by flowchart 600. For example, printing connectivity module B 128 is created in printing device connectivity manager 120. Printing device connectivity manager 120 may keep a list of the printing connectivity modules. Step 810 executes by identifying a second application module at the corresponding printing device to connect with the second printing connectivity module. In this instance, printing connectivity module B identifies application module 114 of printing device B 108 to which to establish connection 144.

Step 812 executes by communicating with the second printing device over the connection between the second printing connectivity module and the second application module. In this instance, printing connectivity module B 128 communicates with application module 114 over connection 144 to interact with printing device B 108. Printing connectivity module B 128 may retrieve data about printing device B 108.

Step 814 executes by receiving print job 103 at DFE system 106. This step is similar to step 702 of flowchart 700 disclosed above. Step 816 executes by translating print job 103 into a file format at DFE system 106. This step is similar to step 706 of flowchart 700 disclosed above. Step 818 executes by selecting a printing device connected to DFE system 106 in which to process and print print job 103. As disclosed above, the printing device may be selected by an operator or according to an attribute of print job 103. For example, print job 103 may require color printing operations. Printing device A 104 is selected as it is the only color printing device within printing system 100.

Step 820 executes by determining the printing connectivity module associated with the selected printing device in which to send print job 103 for printing. In the above color printing example, DFE system 106, using printing device connectivity manager 120, determines that printing connectivity module A 124 communicates with printing device A 104. Step 822 executes by sending print job 103 to printing device A 104 via printing connectivity module A 124. Printing connectivity module A 124 uses connection 142 to send print job 103 to printing device A 104.

Step 824 executes by receiving print job 103 at application module 112 from printing connectivity module A 124. Application module 112 may allow the disclosed embodiments to bypass the DFE within printing device A 104. This feature saves processing time and resources at the printing device. Step 826 executes by processing and printing print job 103 at print engine 260. Print engine 260 receives print job 103 from application module 112.

If printing device B is selected, then DFE system 106 would send print job 103 via printing connectivity module B 128 using APIs Y 126 over connection 144 to application module 114. Application module 114 may then provide the translated print job directly to print engine 116 of printing device B 108.

In some embodiments, printing system 100 may expand the functionality of DFE 106 and printing device connectivity manager 120 to register and connect multiple display devices. Each display device may serve as a virtual printing device as managed by printing device connectivity manager 120. A virtual printing device may resemble a printing device except that it does not render a print job onto a paper media. Instead, the pages are rendered to a display, such as the screen of a tablet, computer, television, mobile phones, smart devices, and the like.

In other embodiments, printing system 100 may expand the functionality of DFE 106 and printing device connectivity manager 120 register and manage access to multiple data storage locations. Storage locations may include memory, or data storage, within DFE 106 as well as external storage locations. DFE 106 may process print jobs with a lot of pages or lots of copies. Such print jobs may have complex, graphics-heavy, and variable data-heavy pages that require an unusual amount of storage space on the RAM and disk space on DFE 106. Printing device connectivity manager 120 may provide additional functionality to manage the storage of such large amounts of data.

Figure 9:
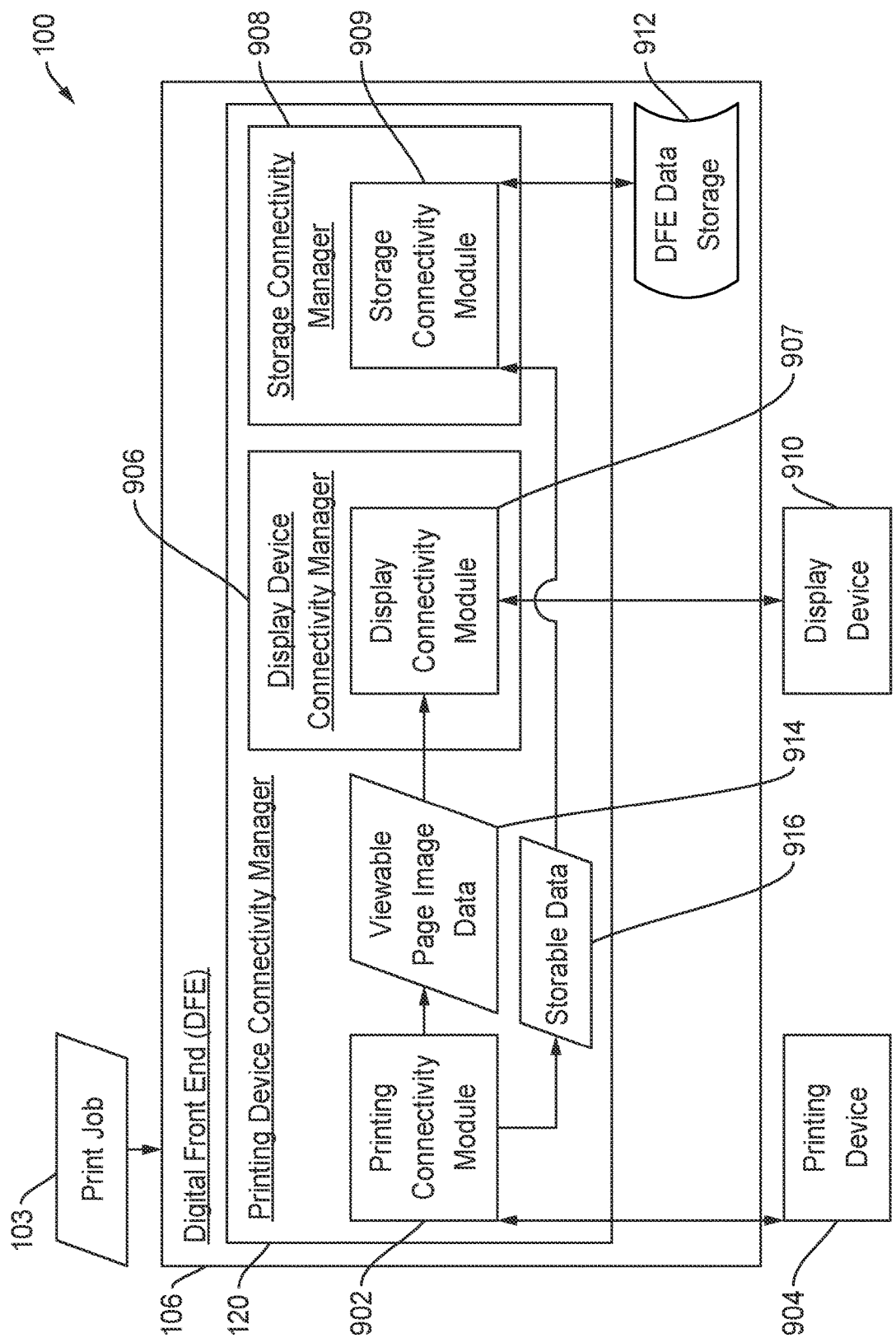
FIG. 9 illustrates a block diagram of the printing system having display device connectivity management and storage connectivity management according to the disclosed embodiments.

FIG. 9 depicts a block diagram of printing system 100 having display device connectivity management and storage connectivity management according to the disclosed embodiments. Printing system 100 may include the components and features disclosed in FIGS. 1A-8 above, but not necessarily repeated herein. As shown, printing system 100 includes DFE system 106, printing device 904, and display device 910.

DFE 106 is disclosed above. In addition, DFE 106 may be a DFE system that includes a computer and software that provides services for accepting a print job 103, such as a PDF file and converting it to a format that print engine 260 can receive, process, and print. DFE 106 may be a terminal or a website that can be monitored or managed. In some embodiments, DFE 106 is within a printing device. In other embodiments, DFE 106 is a system that stands apart from printing devices, display devices, and data storage devices.

DFE 106 may be a suite of applications on the same terminal or on a separate computer that can communicate with DFE 106 via TCP/IP or other networking protocols for monitoring print jobs, data, networking status, and the like. As disclosed above, DFE 106 includes printing device connectivity manager 120. Printing device connectivity manager 120 and its features also are disclosed above. As shown, printing device connectivity manager 120 includes at least one printing connectivity module 902. Printing connectivity module 902 may be similar to printing connectivity module A 124, printing connectivity module B 128, or printing connectivity module C 132 disclosed above. DFE 106, through printing device connectivity manager 120, may use printing connectivity module 902 to interact and communicate with printing device 904. Printing device 904 may be similar to printing device A 104, disclosed above.

Printing device connectivity manager 120 also includes display device connectivity manager 906. Display device connectivity manager 906 is disclosed in greater detail below. Display device connectivity manager 906 allows DFE 106 to connect to various display devices and stream page images processed by the DFE to the registered display devices. As shown in FIG. 9, a display connectivity module 907 interacts and communicates with a display device 910. For example, display connectivity module 907 may provide viewable page image data 914 generated within DFE 106 to display device 910. More than one display connectivity module may be implemented by display device connectivity manager 906.

Printing device connectivity manager 120 also includes storage connectivity manager 908. Storage connectivity manager 908 is disclosed in greater detail below. Storage connectivity manager 908 allows DFE 106 to communicate with various data storages and external data storage devices to manage the storage of data generated by print jobs. Storage connectivity manager 908 also may execute processes to determine where to best store data that exceeds the capacity of DFE data storage 912.

Storage connectivity manager 908 includes a storage connectivity module 909 that interacts and communicates with DFE data storage 912. For example, storage connectivity module 909 may store storable data 916 generated within DFE 106 to DFE data storage 912. When storable data 916 exceeds the capacity for DFE data storage 912, storage connectivity manager 908 may interact with an external data storage or another storage location using another storage connectivity module.

In some embodiments, DFE 106 may implement display device connectivity manager 906 and storage connectivity manager 908 without using printing device connectivity manager 120. They may be separate components operating within DFE 106 to provide the features and functionality disclosed below. DFE 106 may provide viewable page image data and storable data from its components to the managers without the use of printing device connectivity manager 120.

Figure 10:
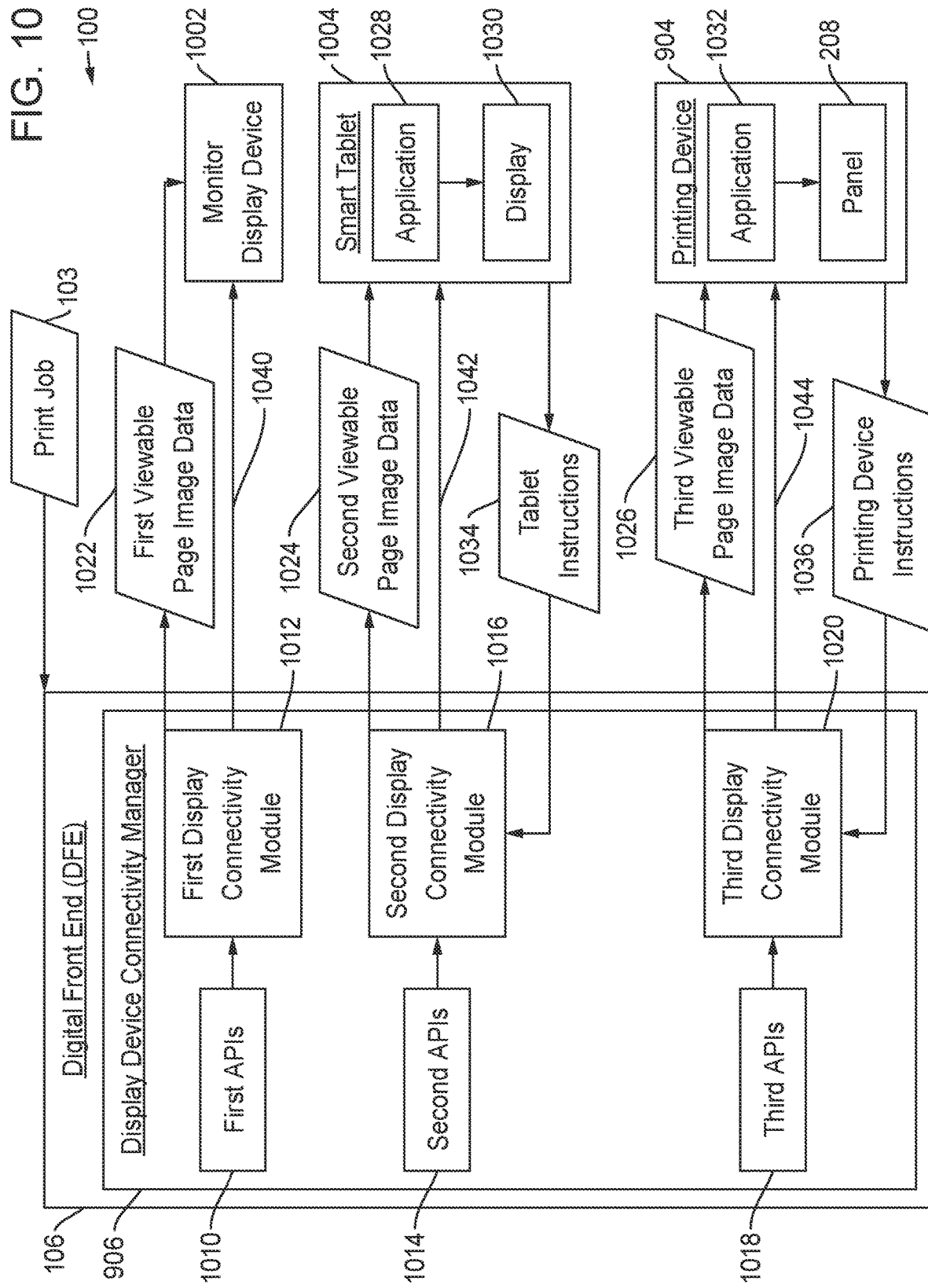
FIG. 10 illustrates a block diagram of the printing system having a display device connectivity manager according to the disclosed embodiments.

FIG. 10 depicts a block diagram of printing system 100 having a display device connectivity manager 906 according to the disclosed embodiments. Display device connectivity manager 906 may be implemented within printing device connectivity manager 120 but is shown as a separate component within DFE 106. DFE 106 is connected to printing devices, as disclosed above. DFE 106 also may be connected to various display devices, such as monitor display device 1002, smart tablet 1004, and printing device 904. Print job 103 is received at DFE 106 for processing.

As disclosed above, this processing of print job 103 may undergo various stages. At each of these stages, there may be a desire for developers, operators, administrators, technical support, customers, and the like to check, verify, and understand how a page is being processed. This feature may allow validation of correctness, accuracy, and reliability of DFE 106. The devices connected to DFE 106 may allow viewing of page data as it is rendered. Some devices even may allow one to interact with DFE 106 to modify a rendered item.

DFE 106 includes display device connectivity manager 906. Display device connectivity manager 906 provides connectivity to display devices using plug-in modules that may be installed on-demand. When installed, DFE 106 may interact with the connected or coupled display devices using display device connectivity manager 906. Display device connectivity manager 906 allows DFE 106 to stream page images processed within the DFE to registered and connected devices.

Display device connectivity manager 906 includes at least two components. One component is display connectivity APIs. Display connectivity APIs include pre-defined interface functions for registering display devices, buffering of processed page images, transmitting the page images to connected display devices, and interacting with the devices. Display connectivity APIs are disclosed in greater detail below.

The other component for display device connectivity manager 906 is one or more display connectivity modules, shown as display connectivity module 907 in FIG. 9. The display connectivity module is an installable plug-in that can be developed independently of DFE 106 and printing device connectivity manager 120. The display connectivity module allows for actual connectivity with external or remote display devices via any networking or communication technology. Display device connectivity manager 906 may include multiple display connectivity modules installed to enable or preview the processing of print job 103 in multiple display devices.

As shown in FIG. 10, display device connectivity module 906 includes first display connectivity module 1012, second display connectivity module 1016, and third display connectivity module 1020. Display connectivity module 907 disclosed above may relate to any one of these display connectivity modules. Each display connectivity module is connected or coupled to a display device. Thus, first display connectivity module 1012 is connected using connection 1040 to monitor display device 1002. Second display connectivity module 1016 is connected using connection 1042 to smart tablet 1004. Third display connectivity module 1020 is connected using connection 1044 to printing device 904.

Printing system 100 may implement connections 1040, 1042, and 1044 via network programming using TCP/IP or network sockets. Connections 1040, 1042, and 1044 also may implement technologies such as a direct USB connection, a parallel port, Bluetooth™, NFC, direct wi-fi, direct LAN connectivity and the like.

When DFE 106 wants to send viewable page image data or communicate with a specific display device, it uses display device connectivity manager 906 to determine which corresponding display connectivity module to use. For example, DFE 106 may generate first viewable page image data 1022 from processing print job 103. DFE 106 will use first display connectivity module 1012 to interact with monitor display device 1002 to provide first viewable page image data 1022 thereto. DFE 106 also may generate second viewable page image data 1024 and third viewable page image data 1026. DFE 106 uses second display connectivity module 1016 to interact with smart tablet 1004 to provide second viewable page image data 1024 thereto. DFE 106 also uses third display connectivity module 1020 to interact with printing device 904 to provide its viewable page image data 1026.

Display connectivity modules are implemented using display connectivity APIs. Each display connectivity module may implement its own plurality of APIs. Thus, first display connectivity module 1012 implements and provides first APIs 1010. Second display connectivity module 1016 implements and provides second APIs 1014. Third display connectivity module 1020 implements and provides third APIs 1018. First APIs 1010 provide the functionality for first display connectivity module 1012 to communicate with monitor display device 1002. Second APIs 1014 provide the functionality for second display connectivity module 1016 to communicate with smart tablet 1004. Third APIs 1018 provide the functionality for third display connectivity module 1020 to communicate with printing device 904.

Using display device connectivity manager 906, DFE 106 may communicate directly with display devices acting as virtual printing devices within printing system 100. Additional display connectivity modules may be added to display device connectivity manager 906 as display devices are added to printing system 100. Display device connectivity manager 906 creates the display connectivity module using the associated APIs. DFE software does not need to be modified. Further, a display connectivity module may be removed if a display device is removed.

The display connectivity modules also may differ. For example, first display connectivity module 1012 may be a simple connectivity module. It uses connection 1040 to connect to monitor display device 1002. Monitor display device 1002 may be a regular display device such as a computer monitor to be used for mainly viewing videos or displaying pictures. Monitor display device 1002 just needs some input signals to activate. Once tuned to input, monitor display device 1002 displays first viewable page image data 1022.

Second display connectivity module 1016 and third display connectivity module 1020 may be smart connectivity modules. They use connections 1042 and 1044 to connect to smart tablet 1004 and printing device 904, respectively. Smart tablet 1004 and printing device 904 may be considered smart devices as they can send instructions or responses to DFE 106. DFE 106 may act on these instructions with regard to processing data from print job 103. They also implement applications to receive viewable page image data and to provide a response to DFE 106 using the corresponding display connectivity module. Connections to smart devices may not be limited to video or images.

For example, smart tablet 1004 may include application 1028. Application 1028 may be an application, driver, or service to receive viewable page image data and signals from display device connectivity manager 906. Application 1028 displays second viewable page image data 1024 on display 1030 of smart tablet 1004. The operator may view the data and provide input to application 1028 that is relayed back to DFE 106 as tablet instructions 1034. DFE 106 may act on tablet instructions 1034. Second display connectivity module 1016 provides the features to enable these communications.

DFE 106 may communicate with printing device 904 for other operations aside from printing operations. Here, DFE 106 may provide third viewable page image data 1026 for display to an operator for approval before sending the rendered page data to the print engine of printing device 904. Printing device 904 includes application 1032 that acts similar to application 1028 disclosed above. Application 1032 may provide the page image data to operations panel 208 for printing device 904. Operations panel 208 is disclosed above. The operator may provide input or instructions regarding third viewable page image data 1026 using application 1032. Application 1032 communicates printing device instructions 1036 back to DFE 106 through third display connectivity module 1020.

DFE 106, therefore, may not only stream data to display devices. It also may interact with the display devices to change printing operations. For example, printing device instructions 1036 may include instructions to change to color printing after review of third viewable page image data 1026. In some embodiments, DFE 106 may not send page image data until receiving a request from smart tablet 1004 or printing device 904. DFE 106 may not want to waste resources streaming data until requested.

In some embodiments, DFE 106 may send other types of data and is not limited to providing viewable page image data to connected devices. Display device connectivity manager 906 may enable DFE 106 to transmit diagnostic data, core dumps, configuration data, maintenance data, and other such data to be viewed remotely or externally at real-time for certain stages of the processing of print job 103 by DFE 106.

For example, the operator may use application 1028 on smart tablet 1004 to send second tablet instructions 1034 to DFE 106 requesting diagnostics data for printing device 904, which may be connected to DFE 106 using a printing connectivity module of printing device connectivity manager 120. Printing device 904 may provide this information back to DFE 106, which then uses second display connectivity module 1016 to provide the diagnostic information to smart tablet 1004 for display on display 1030.

In some embodiments, display device connectivity manager 906 may be configured to transmit data, either viewable page image data or other data, periodically, at a set time according to a schedule, or randomly. Scheduled transmission of data may serve as a tool for monitoring print quality, consistency, monitoring print job progress, diagnostics, and the like. Random transmission of data may serve as a tool for diagnostics, random checks of print quality, security checks, reliability checks and the like. Further, printing device connectivity manager 120 may periodically or randomly perform quality or calibration checks that may be sent to printing devices or display devices for auto-recalibration, diagnostics, quality checks, and the like.

Figure 11:
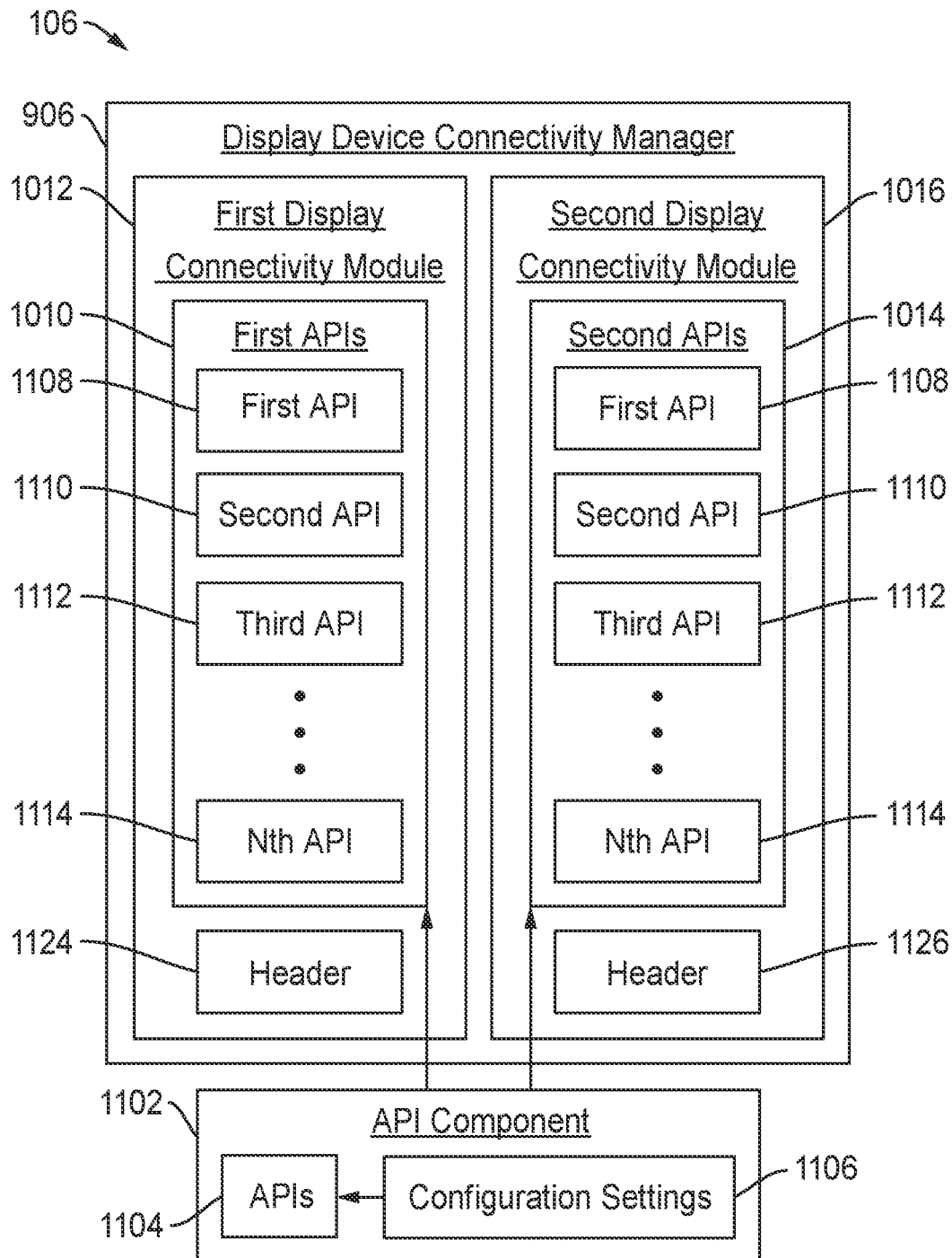
FIG. 11 illustrates a block diagram showing APIs being used to create display connectivity modules within the display device connectivity manager according to the disclosed embodiments.

FIG. 11 depicts a block diagram showing APIs being used to create display connectivity modules within display device connectivity manager 906 according to the disclosed embodiments. As disclosed above, a display connectivity module used the APIs defined in API component 1102 to implement pre-defined or standard interface functions for handling, managing, and transmitting viewable page image data to a selected display device. API component 1102 is a separate component having a plurality of APIs 1104. API component 1102 may be within display device connectivity manager 906. Alternatively, API component 1102 may be within printing device connectivity manager 120 or DFE 106.

Each display connectivity module implements and provides the APIs identified in API component 1102. This action may be performed when a display connectivity module is created within display device connectivity manager 906. The display connectivity module includes a dynamic link library (DLL) or module that is loaded at run-time in DFE 106. The DLL may contain code and data this is used by more than one display connectivity module at the same time. This feature promotes API reuse and efficient memory storage.

Each display connectivity module may be developed as a DLL or other format that may be detected, loaded, and interacted with by printing device connectivity manager 120 or DFE 106. It also may be possible that a configuration be included with the display connectivity module that is used by DFE 106 or printing device connectivity manager 120 in order to install, integrate, and activate the display connectivity module in DFE 106. In another embodiment, a standard installation program may be provided to integrate, configure, and activate the use of the plug-in in DFE 106.

For example, when first display connectivity module 1012 is created, it will load first APIs 1010 from API component 1102. A plurality of APIs may be loaded to first display connectivity module 1012. First display connectivity module implements first API 1108, second API 1110, third API 1112, up to Nth API 1114. Second display connectivity module 1016 also loads second APIs 1014 using the same process from API component 1102. Second display connectivity module 1016 implements first API 1108, second API 1110, third API 1112, up to Nth API 1114 as well. Any number of APIs may be implemented by the display connectivity modules.

In some embodiments, configuration settings 1106 of the different display devices may be stored at DFE 106. Configuration settings 1106 may be used to provide additional data along with the APIs provided to the specific display connectivity modules to tailor the APIs to the display device. For example, configuration settings 1106 may indicate whether a display device is a smart device, capable of providing instructions back to DFE 106. Alternatively, configuration settings 1106 may be provided to each display connectivity module based on which display device is connected thereto.

Each display connectivity module may include a header file to facilitate integration of the module within display device connectivity manager 906 or DFE 106. The header file may be file that contains function declarations and macro definitions to be shared between several source files. First display connectivity module 1012 may include header file 1124 and second display connectivity module 1016 may include header file 1126. In some embodiments, the display connectivity module may not need to have a header file as the display connectivity module may be installed into display device connectivity manager 906 using standard installer programs.

Figure 12:
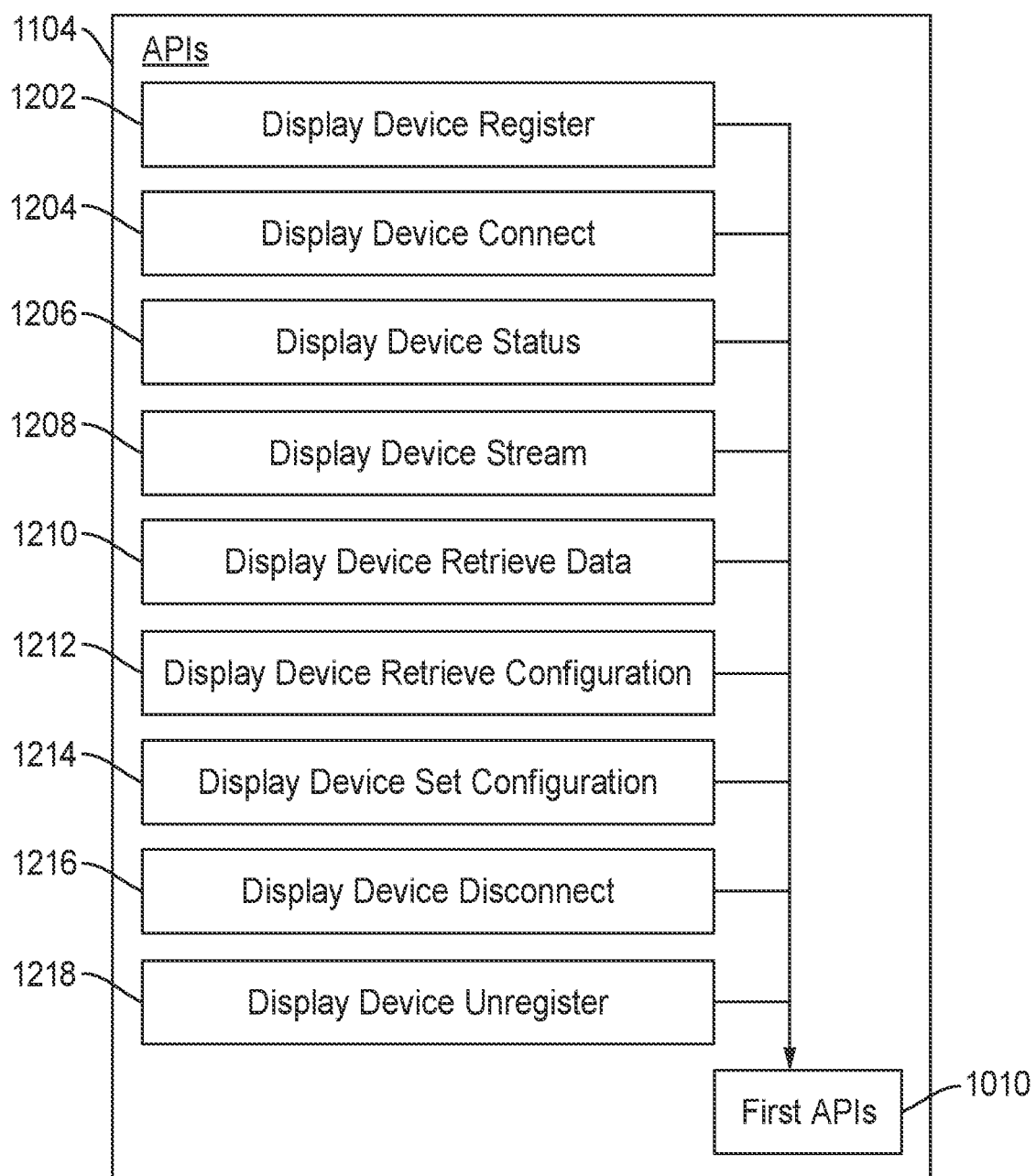
FIG. 12 illustrates a block diagram of a plurality of APIs for use within display connectivity modules according to the disclosed embodiments.

FIG. 12 depicts a block diagram of a plurality of APIs for use within display connectivity modules within display device connectivity manager 906 according to the disclosed embodiments. As disclosed above, display connectivity APIs are implemented by the display connectivity modules to provide the functionality in communicating with the display devices connected to DFE 106. APIs 1104 may include pre-defined APIs that provide display device communication and support for DFE 106.

As disclosed above, an API provides the means for two or more computer programs, such as second display connectivity module 1016 and application 1028 of smart tablet 1004, to communicate with each other. APIs 1104 connect DFE 106 to the display devices within printing system 100. An API specification may define how the APIs are to be used by the display connectivity modules.

Referring to FIG. 12, examples of interface functions are disclosed. Other interfaces may be defined, identified, or added to APIs 1104, as needed. Further, the data exchanged through APIs 1104 may vary in format, as necessary. DFE 106 may add or remove an API from APIs 1104 as needed to update the capabilities of the DFE system. This feature alleviates the need to update the software of DFE 106.

Display device register API 1202 may register display device information. When implemented within a display connectivity module, display device register API 1202 receives the display device information. For example, display device register API 1202, if used within first APIs 1010, may register display device information for monitor display device 1002. Display device register API 1202 enables printing device connectivity manager 120 to recognize a connection to a new display device. It also allows viewable page image data to be streamed to the connected display device.

Display device connect API 1204 may enable connectivity to the registered display device. This API allows DFE 106 to establish a connection session between the display connectivity module and the corresponding display device. For example, third display connectivity module 1020 may use display device connect API 1204 within third APIs 1018 to establish connection 1044 with printing device 904.

Display device status API 1206 allows DFE 106 to retrieve the status of a connected display device. When implemented within a display connectivity module, display device status API 1206 detects and retrieves the status for the connected display device, such as on, off, busy, and the like. For example, second display connectivity module 1016 may use display device status API 1206 within second APIs 1014 to detect and retrieve the status of smart tablet 1004. Smart tablet 1004, for example, may be turned off.

Display device stream API 1208 sends viewable page image data to the connected display device. When implemented within a display connectivity module, display device stream API 1208 sends viewable page image data from DFE 106 to the corresponding display device. For example, first display connectivity module 1012 may use display device stream API 1208 within first APIs 1010 to send, or stream, first viewable page image data 1022 to monitor display device 1002.

Display device retrieve data API 1210 retrieves some data from the display device, if possible. When implemented within a display connectivity module, display device retrieve data API 1210 retrieves data from the connected display device, if the display device is able to send data. Some data may include a device identification, IP address, if applicable. For a smart display device, instructions may be retrieved. For example, second display connectivity module 1016 may use display device retrieve data API 1210 to retrieve tablet instructions 1034 from smart tablet 1004.

Display device retrieve configuration API 1212 detects and retrieves display device attributes, such as resolution and other supported capabilities. When implemented within a display connectivity module, display device retrieve configuration API 1212 may retrieve the display device attributes from a connected display device. For example, first display connectivity module 1012 may use display device retrieve configuration API 1212 to retrieve the resolution used by monitor display device 1002 using connection 1040.

Display device set configuration API 1214 sets or makes changes to the display device configuration, such as different resolution, brightness, or other settings that may be possible to change via the established connection. When implemented within a display connectivity module, display device set configuration API 1214 may change the display device configuration or settings. For example, first display connectivity module 1012 may use display device set configuration API 1214 to change the brightness of monitor display device 1002 using connection 1040.

Display device disconnect API 1216 disconnects the display device from DFE 106. When implemented within a display connectivity module, display device disconnect API 1216 disconnects the associated display device from DFE 106. For example, third display connectivity module 1020 may disconnect printing device 904 from DFE 106 using display device disconnect API 1216 to end connection 1044.

Display device unregister API 1218 removes registration information for a display device from DFE 106. This feature will prevent future use of the display device in printing system 100. When implemented within a display connectivity module, display device unregister API 1218 removes the registration information for the corresponding display device from DFE 106 so that future connections are not established with the display device. For example, first display connectivity module 1012 may use display device unregister API 1218 to remove registration information for monitor display device 1002 from DFE 106. A connection may not be established between DFE 106 and monitor display device 1002 until the display device registers with display device register API 1202.

These APIs may be used for first API 1108, second API 1110, third API 1112, and so on up to Nth API 1114. Other APIs also may be implemented by display APIs 1104. Other interface functions may be added, redefined, or modified. Standard APIs that exist without being pre-defined also may be implemented. As shown in FIG. 12, APIs 1104 may be used to implement first APIs 1010 for first display connectivity module 1012.

The data exchanged through these APIs may be in varying formats, as necessary. The formats include video formats avi, mpeg/mp4, mov, wmv, webm, mkv, fly, qt, and the like. These formats may be built-in on the display device and include video formats not included above.

Figure 13:
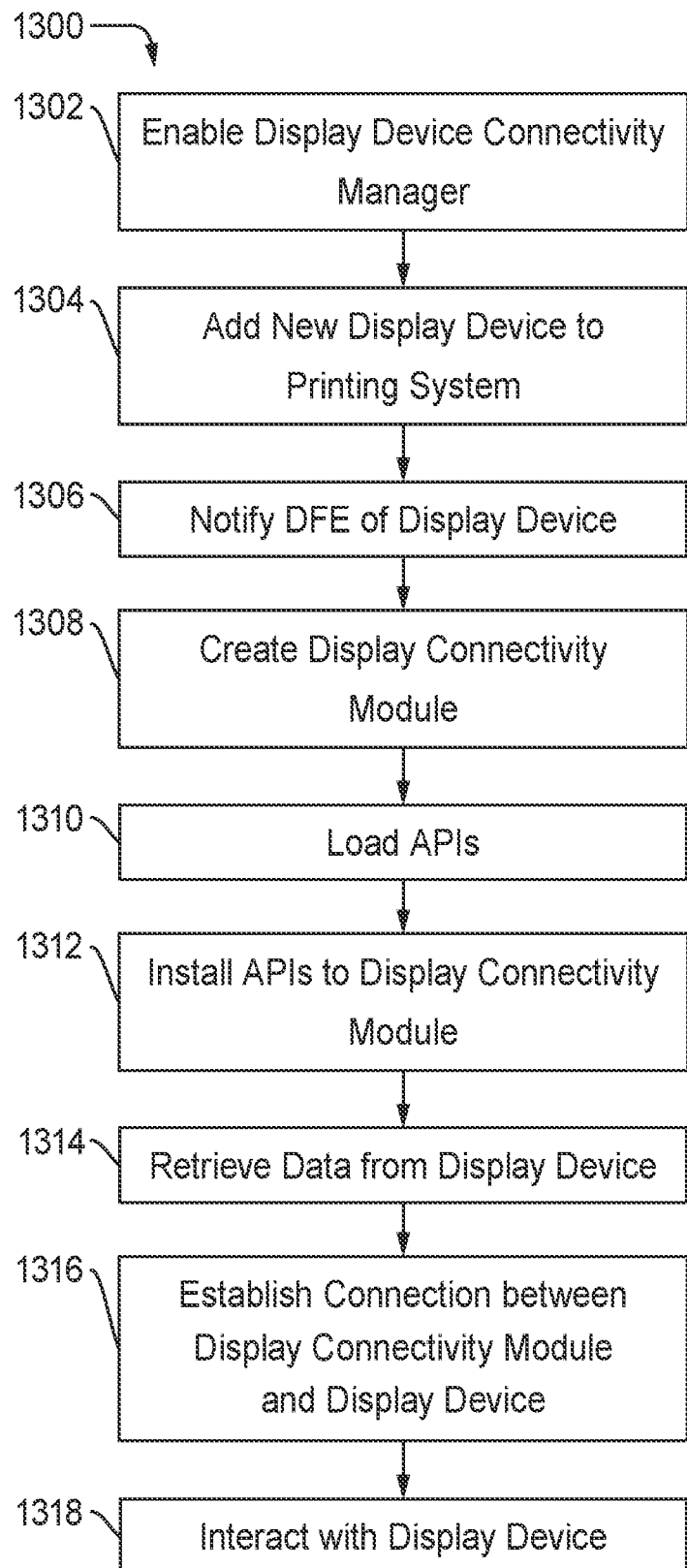
FIG. 13 illustrates a flowchart for creating and implementing a display connectivity module within a display device connectivity manager according to the disclosed embodiments.

FIG. 13 depicts a flowchart 1300 for creating and implementing a display connectivity module within display device connectivity manager 906 according to the disclosed embodiments. Flowchart 1300 may refer to FIGS. 1A-12 for illustrative purposes. Flowchart 1300, however, is not limited to the embodiments disclosed by FIGS. 1A-12.

Step 1302 executes by enabling display device connectivity manager 906 at DFE 106. DFE 106 may install display device connectivity manager 906 along with API component 1102, which includes APIs 1104 for use in communicating and interacting with the display devices within printing system 100. Display device connectivity manager 906 allows DFE 106 to dynamically interact with various devices within printing system 100. This component also maintains and manages the list of display device connections and identifies the display connectivity module in which to interact in communicating with a specific display device.

Step 1304 executes by adding a new display device to printing system 100. The new display device also connects with DFE 106. For example, smart tablet 1004 may be added to printing system 100. Monitor display device 1002 may already be connected to DFE 106. Step 1106 executes by notifying DFE 106 of the new display device. DFE 106 seeks to establish a connection with the new display device. For example, DFE 106 needs to establish connection 1042 with smart tablet 1004.

Step 1308 executes by creating second display connectivity module 1016 in display device connectivity manager 906. Second display connectivity module 1016 may be an installable plug-in component within display device connectivity manager 906. Step 1310 executes by loading a plurality of APIs at display device connectivity manager 906 to implement second display connectivity module 1016. The new display connectivity module may call to API component 1102 to retrieve or load second APIs 1014 from APIs 1104.

Step 1312 executes by installing second APIs 1014 at second display connectivity module 1016. Second APIs 1014 provide the interfaces within second display connectivity module 1016 to manage, handle, or transmit second viewable page image data 1024 within DFE 106. Step 1314 executes by retrieving data and information from smart tablet 1004, newly added to printing system 100. This data and information may include display device capabilities, smart device information, if applicable, unique identification information, and the like. For example, the information may include a device serial number, IP address, and the like as well as display device settings.

Step 1316 executes by establishing connection 1042 between second display connectivity module 1016 and smart tablet 1004. Display device connectivity manager 906 may update its list of connected display devices with this connection. Step 1318 executes by interacting with smart tablet 1004 from DFE 106 using second display connectivity module 1016. Such an interaction may include streaming second viewable page image data 1024 or receiving tablet instructions 1034 from smart tablet 1004.

Figure 14:
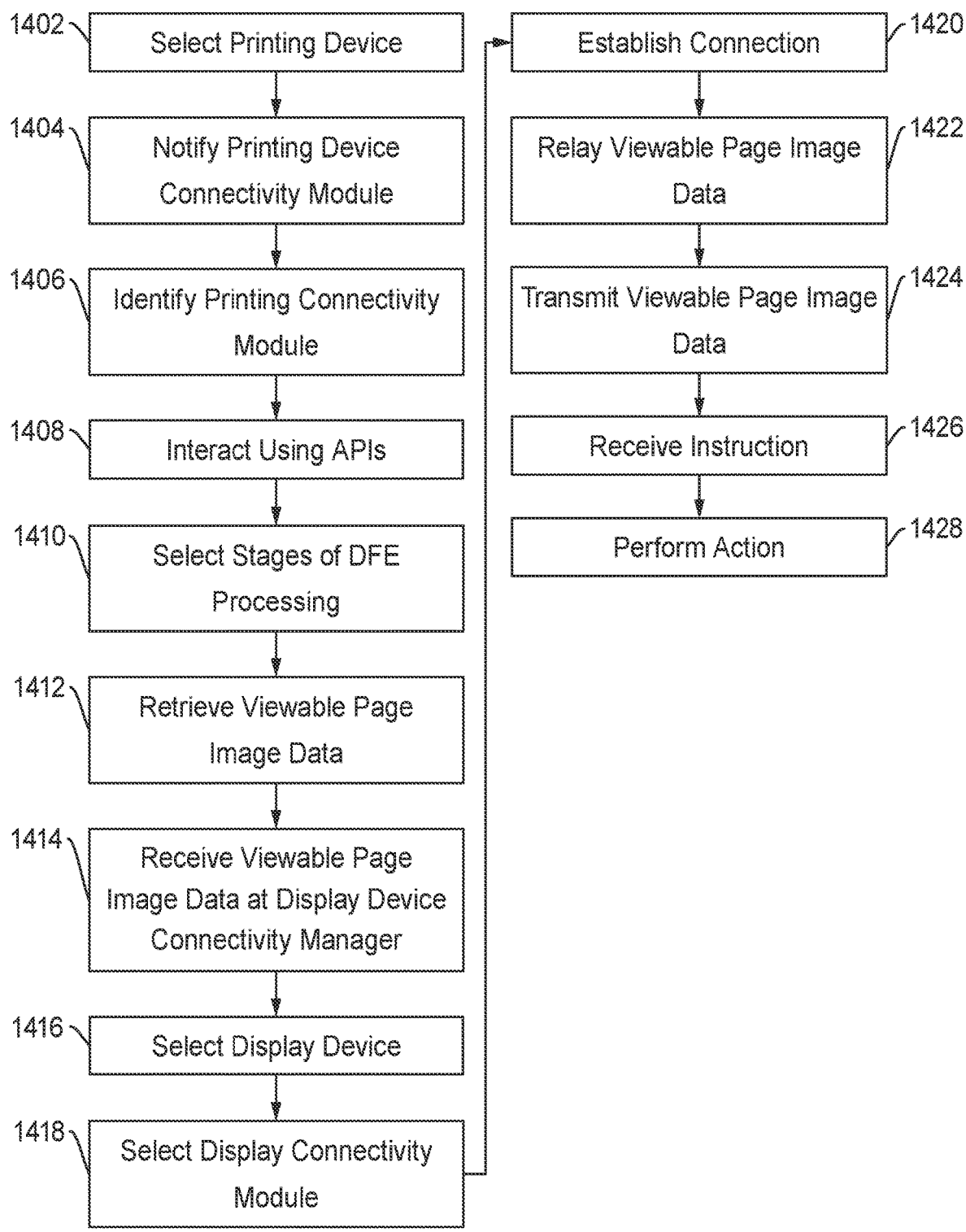
FIG. 14 illustrates a flowchart for a workflow within a DFE with the display device connectivity manager according to the disclosed embodiments.

FIG. 14 depicts a flowchart 1400 for a workflow within a DFE 106 with a display device connectivity manager 906 according to the disclosed embodiments. Flowchart 1400 may refer to FIGS. 1A-13 for illustrative purposes. Flowchart 1400, however, is not limited to the embodiments disclosed by FIGS. 1A-13.

Step 1402 executes by selecting a printing device, such as printing device A 104, within printing system 100 to execute print job 103. DFE 106 may detect printing devices through printing device connectivity manager 120. Printing device connectivity manager 120 provides a list of printing devices detected or obtained through installed printing connectivity modules, such as printing connectivity module A 124. DFE 106 also may allow the operator to select a printing device. Otherwise, DFE 106 or printing device connectivity manager 120 may select the applicable printing device based on job settings or other criteria.

Step 1404 executes by notifying the applicable printing device connectivity module of printing device connectivity manager 120 about the selected printing device. Using the above example, printing device connectivity manager 120 is notified that printing device A 104 will perform printing operations for print job 103. Step 1406 executes by identifying the applicable printing connectivity module for the selected printing device. Printing device connectivity manager 120 identifies printing connectivity module A 124 as corresponding to printing device A 104.

Step 1408 executes by interacting with printing device A 104 using APIs X 122 of printing connectivity module A 124. DFE 106 uses APIs X 122 of printing connectivity module A 124 to interact, retrieve data, or send data with printing device A 104. These features are disclosed above. In addition, printing device connectivity manager 120 may help in displaying data related to print job 103 within printing system 100.

Step 1410 executes by selecting stages of processing within DFE 106 to provide viewable page image data. Printing device connectivity manager 120 may select the stages. As disclosed above, processing of print job 103 may occur in several stages. Printing device connectivity manager 120 indicates which stage or stages will send viewable page image data to a display device within printing system 100. It should be noted that the viewable page image data is generated within DFE 106 and not necessarily at printing device A 104.

Step 1412 executes by retrieving the viewable page image data from DFE 106 during the selected stages by printing device connectivity manager 120. Printing device connectivity manager 120 may receive the viewable page image data from the applicable component within DFE 106, such as RIP firmware 190. Step 1414 executes by receiving the viewable page image data generated within DFE 106 at display device connectivity manager 906, which may be within printing device connectivity manager 120. Thus, DFE 106 provides the viewable page image data at the specified stage to display device connectivity manager 906.

Step 1416 executes by selecting a display device to receive the viewable page image data. Display device connectivity manager 906 may provide a list of display devices registered or obtained through the installed display connectivity modules. The operator may select the display device to receive the viewable page image data. Alternatively, DFE 106 may select the display device according to some criteria or feature of the viewable page image data. For example, the data may be in a specific video data format that is supported by a specific display device within printing system 100.

Step 1418 executes by selecting an activated display connectivity module by display device connectivity manager 906 to interact with the selected display device. For example, the display device connectivity manager may select second display connectivity module 1016 because smart tablet 1004 is selected to receive second viewable page image data 1024. Step 1420 executes by establishing connection 1042 between second display connectivity module 1016 and smart table 1004, if needed. In some embodiments, connection 1042 may already be established.

Step 1422 executes by relaying the viewable page image data to the active display connectivity module. Using the above example, display device connectivity manager 906 relays second viewable page image data 1024 to second display connectivity module 1016. Step 1424 executes by transmitting the viewable page image data from DFE 106 to smart tablet 1004 using second display connectivity module 1016. Second display connectivity module 1016 may utilize second APIs 1014 to interact and communicate with smart tablet 1004.

In some embodiments, second display connectivity module 1016 continually transmits second viewable page image data 1024 to smart tablet 1004 using connection 1042. In other embodiments, second display connectivity module 1016 may wait for a signal or instruction from smart tablet 1004 as the connected display device for its respective readiness to receive new viewable page image data. This feature may be enabled as smart tablet 1004 is a smart device.

Thus, step 1426 executes by receiving an instruction from the connected display device to take an action. For example, smart tablet 1004 may send tablet instruction 1034 to send new viewable page image data once it is generated by DFE 106. Step 1428 executes by performing the action of the received instruction by DFE 106, printing device connectivity manager 120, or display device connectivity manager 906. For example, DFE 106 may provide updated second viewable page image data 1024 that is provided to smart tablet 1004 using second display connectivity module 1016.

Figure 15:
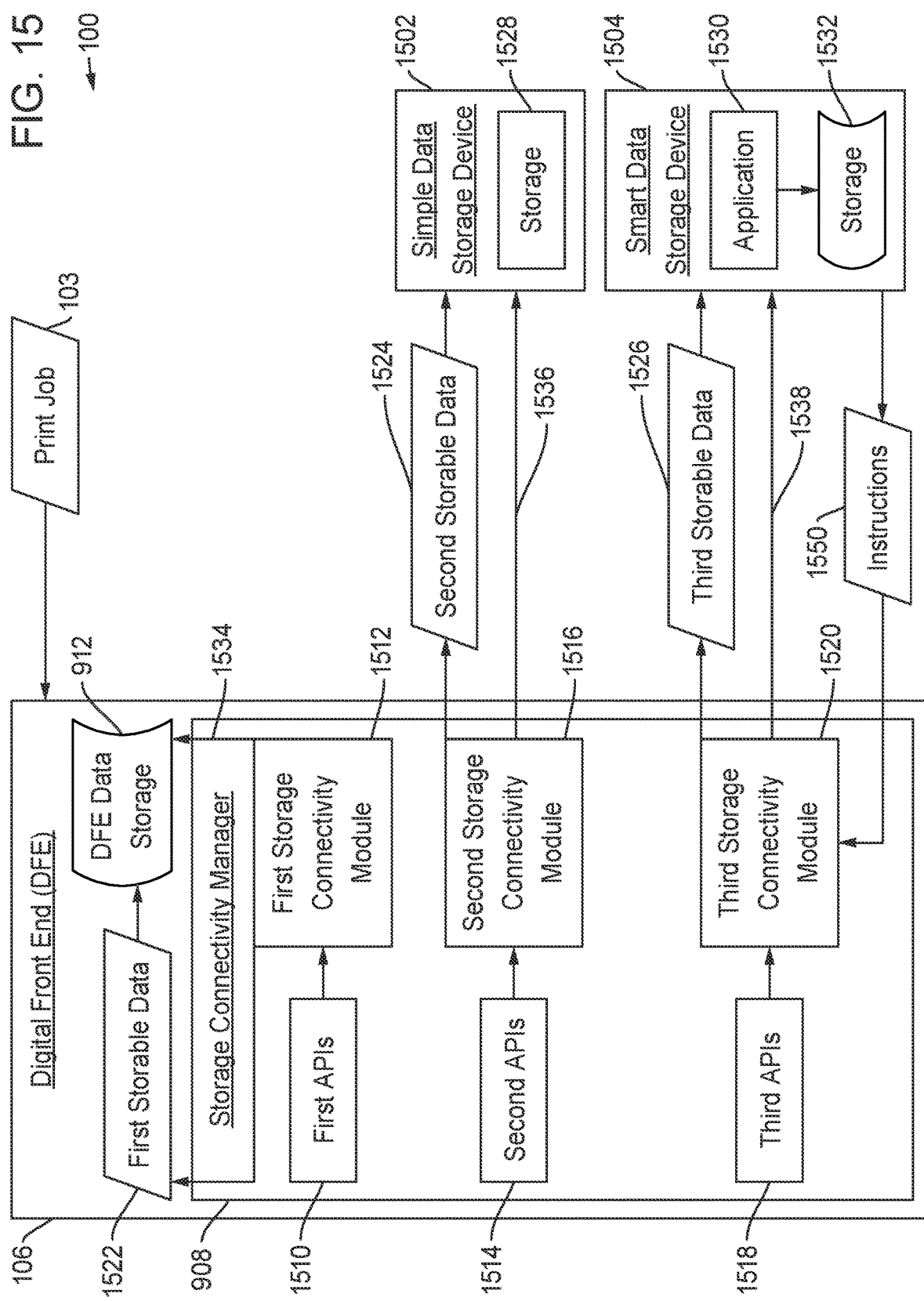
FIG. 15 illustrates a block diagram of the printing system having a storage connectivity manager according to the disclosed embodiments.

FIG. 15 depicts a block diagram of printing system 100 having a storage connectivity manager 908 according to the disclosed embodiments. Storage connectivity manager 908 may be implemented within printing device connectivity manager 120 but is shown as a separate component within DFE 106. DFE 106, or DFE system 106, is connected to printing devices, as disclosed above. DFE 106 also may be connected to various data storages and data storage devices, such as DFE data storage 912, simple data storage device 1502, and smart data storage device 1504.

Print job 103 may be a print job with a lot of pages, in the hundreds or even thousands. Alternatively, print job 103 may have a fewer number of pages but printed in multiple copies in the hundreds or thousands. Further, print job 103 may be a production print job having complex, graphics-heavy, and variable-data heavy pages with color images and the like. Such jobs may require an unusual amount of storage space on DFE 106.

DFE 106 is limited to the storage space of DFE data storage 912. If additional data storage space is needed, then DFE 106 may use external storage devices, such as SSD, flash memory drives, or an external hard drive. DFE 106, however, may be limited to the number of such devices that can be attached. Further, DFE 106 may be burdened with a large number of connected devices to the point that using DFE 106 would be defeated. DFE 106 is a DFE system that is meant to be a very fast processing device for production printing within printing system 100.

DFE 106 includes storage connectivity manager 908. Storage connectivity manager 908 provides connectivity to data storage and storage devices using plug-in modules that may be installed on-demand. When installed, DFE 106 may interact with the connected or coupled data storages using storage connectivity manager 908. Storage connectivity manager 908 allows DFE 106 to select and store data as needed between the different storage locations and devices during printing operations.

Storage connectivity manager 908 includes at least two components. One component is storage connectivity APIs. Storage connectivity APIs include pre-defined interface functions for registering storage devices, buffering of print jobs, buffering intermediate processed page data, and transmitting such data to connected storage devices. This data may be known as storable data.

The other component for storage connectivity manager 908 is one or more storage connectivity modules, shown as storage connectivity module 909 in FIG. 9. The storage connectivity module is an installable plug-in that may be developed independently of DFE 106 and printing device connectivity manager 120. Each storage connectivity module is connected or coupled to a data storage location or a data storage device. This module allows for actual connectivity with external or remote storage devices via networking or communication technologies, such as TCP/IP, HDMI, Wi-fi, Bluetooth™, serial, and the like.

In FIG. 15, storage connectivity manager 908 includes three storage connectivity modules. First storage connectivity module 1512 is connected using connection 1534 to DFE data storage 912. DFE data storage 912 may be the DFE internal data storage, or main storage, installed in the DFE system. DFE data storage 912 may be the hard drive, SSD, or other built-in or pre-installed data storage. Second storage connectivity module 1516 is connected using connection 1536 to simple data storage device 1502. Third storage connectivity module 1520 is connected using connection 1538 to smart data storage device 1504. Other storage connectivity modules may be implemented to connect with additional data storage devices.

Printing system 100 may implement connections 1536 and 1538 via network programming using TCP/IP or network sockets. Connections 1536 and 1538 also may implement technologies such as a direct USB connection, a parallel port, Bluetooth™, NFC, direct wi-fi, direct LAN connectivity and the like.

When DFE 106 wants to send storage data or communicate with a specific data storage or storage device, it uses storage connectivity manager 908 to determine which corresponding data storage or storage device to use. For example, DFE 106 may generate first storable data 1522 while processing print job 103. When the amount of data being generated by DFE 106 exceeds the parameters of DFE data storage 912, DFE 106 will need to store additional data someplace else. Thus, DFE 106 generates second storable data 1524 to be stored at simple data storage device 1502 using second storage connectivity module 1516. DFE 106 also may generate third storable data 1526 to be stored at smart data storage device 1504 using third storage connectivity module 1520.

Storage connectivity modules are implemented using storage connectivity APIs. Each storage connectivity module may implement its own plurality of APIs. Thus, first storage connectivity module 1512 implements and provides first APIs 1510. Second storage connectivity module 1516 implements and provides second APIs 1514. Third storage connectivity module 1520 implements and provides third APIs 1518. First APIs 1510 provide the functionality for first storage connectivity module 1512 to communicate with DFE data storage 912. Second APIs 1514 provide the functionality for second storage connectivity module 1516 to communicate with simple data storage device 1502. Third APIs 1518 provide the functionality for third storage connectivity module 1520 to communicate with smart data storage device 1504.

Using storage connectivity manager 908, DFE 106 may communicate directly with storage locations and devices acting as data storage devices within printing system 100. Additional storage connectivity modules may be added to storage connectivity manager 908 as storage devices are added to printing system 100. Storage connectivity manager 908 creates the storage connectivity module using the associated APIs. DFE software does not need to be modified. Further, a storage connectivity module may be removed if a storage device is removed.

The storage connectivity modules also may differ. For example, second storage connectivity module 1516 may be a simple storage connectivity module. It uses connection 1536 to connect to simple data storage device 1502. Simple data storage device 1502 may be a storage device that registers into printing system 100 as a basic storage device, such as a network drive, external drive, or smart shared network storage. Simple data storage device 1502 may receive second storable data 1524 and store it in storage location 1528. Once connected, storage connectivity manager 908 may send storable data as needed to simple data storage device 1502.

Third connectivity module 1520 may be a smart storage connectivity module. It uses connection 1538 to connect to smart data storage device 1504. Smart data storage device 1504 may be considered a smart storage device as it can send instructions or responses to DFE 106. DFE 106 may act on these instructions with regard to processing data from print job 103. Smart data storage device 1504 also implements an application to receive storable data and to provide a response to DFE 106 using third storage connectivity module 1520.

Smart data storage device 1504 may be a computer, server, or cloud services. Connectivity to smart data storage device 1504 may be through TCP/IP or other networking protocols. A software system service, driver, or application 1530, (hereafter application 1530) may be developed to receive third storable data 1526 plus signals from DFE 106, printing device connectivity manager 120, or storage connectivity manager 908. Third storable data 1526 also may include page image data, diagnostics data, processing data, color conversion data, and the like. This data may be transmitted and stored in storage location 1532 installed on smart data storage device 1504.

Smart data storage device 1504 may use application 1530 to send instructions 1550 to DFE 106. The disclosed embodiments may use connection 1538 to send instructions 1550. An operator may input information to generate instructions 1550 as the storage device is a smart device. DFE 106 may receive instructions 1550 using third storage connectivity module 1520. DFE 106, therefore, may interact with data storage devices in performing printing operations. For example, smart data storage device 1504 may send instructions 1550 to indicate when storage location 1532 is getting full or past a threshold of available memory. DFE 106 may then act on this information.

The disclosed embodiments allow for connected storage devices to be distant and remote to serve as additional storage to be used in the DFE system. This feature will provide, in theory, unlimited storage space to DFE 106, thereby relieving it of the limitations of DFE data storage 912. The storage connectivity modules may be developed independently of printing device connectivity manager 120 as long as they provide and implement the corresponding storage connectivity APIs. These features will allow DFE systems to have unlimited storage space for any print job that it may receive throughout the lifetime of its hardware components. As drive space is needed, additional data storage may be registered, integrated, and activated through the use of storage connectivity manager 908 and the associated storage connectivity modules.

In some embodiments, operators of DFE systems may start with a basic storage configuration, such as DFE data storage 912. They may upgrade their storage capacity by integrating the disclosed DFE storage connectivity system with storage connectivity manager 908. This feature allows developers and manufacturers of DFE systems to develop new capabilities into the DFE systems, such as DFE 106 of printing system 100. For example, a capability may be storing data generated for print jobs for a longer time or even indefinitely. This feature may allow for storing of pre-rendered images that will improve performance of re-printing previously processed, color-converted, or halftoned images. Re-printing of pre-rendered images will save processing time, color conversion operations, and other DFE processing. The pre-rendered images may be sent and processed directly in the production printing devices.

Figure 16:
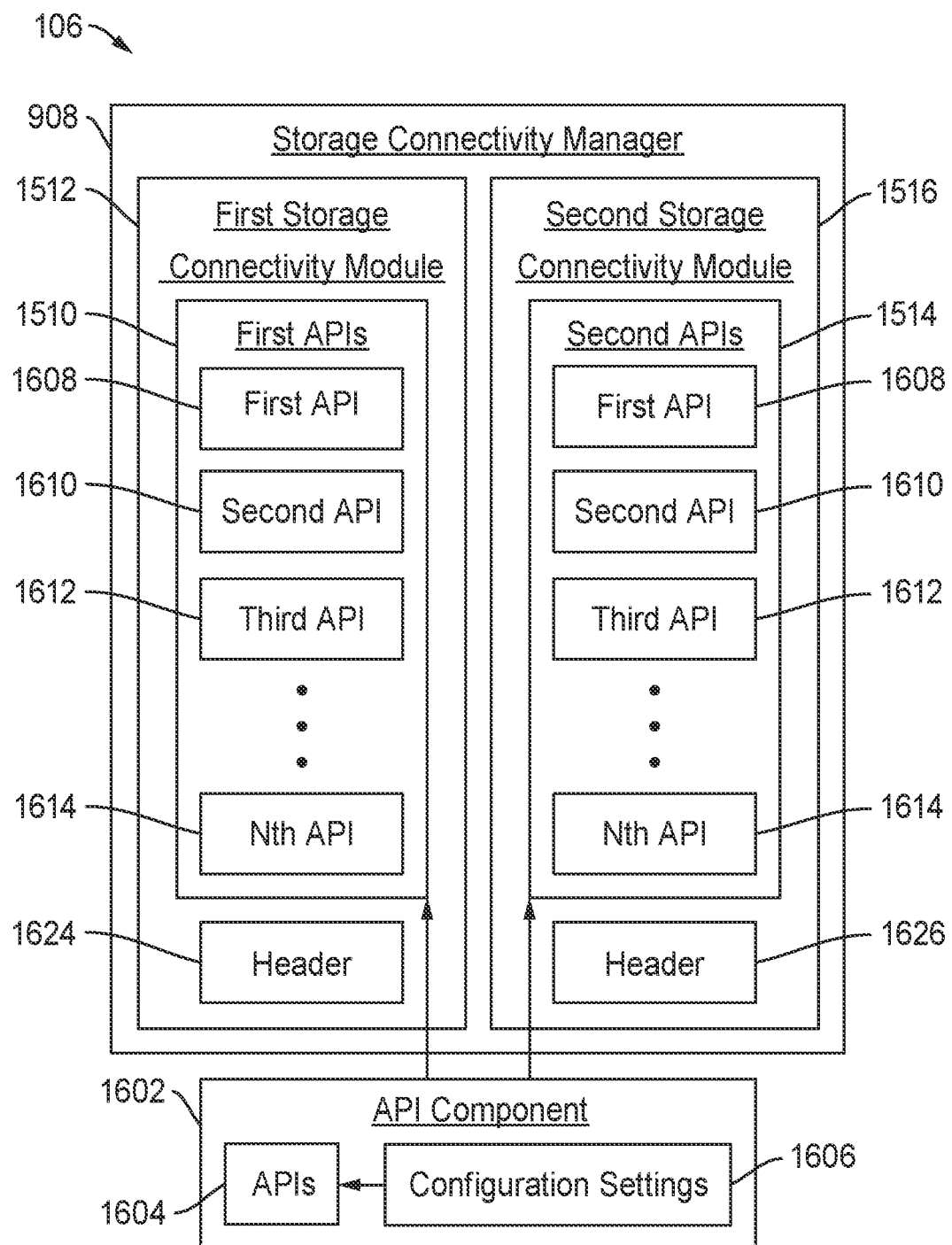
FIG. 16 illustrates a block diagram showing APIs being used to create storage connectivity modules within the storage connectivity manager according to the disclosed embodiments.

FIG. 16 depicts a block diagram showing APIs being used to create storage connectivity modules within storage connectivity manager 908 according to the disclosed embodiments. As disclosed above, a storage connectivity module uses the APIs defined in API component 1602 to implement pre-defined or standard interface functions for handling, managing, and transmitting storable data to a selected storage or storage device. API component 1602 is a separate component having a plurality of APIs 1604. API component 1602 may be within storage connectivity manager 908. Alternatively, API component 1602 may be within printing device connectivity manager 120 or DFE 106.

Each storage connectivity module implements and provides the APIs identified in API component 1602. This action may be performed when a storage connectivity module is created within storage connectivity manager 908. The storage connectivity module includes a dynamic link library (DLL) or module that is loaded at run-time in DFE 106. The DLL may contain code and data this is used by more than one storage connectivity module at the same time. This feature promotes API reuse and efficient memory storage.

Each storage connectivity module may be developed as a DLL or other format that may be detected, loaded, and interacted with by storage connectivity manager 908 or DFE 106. It also may be possible that a configuration be included with the storage connectivity module that is used by DFE 106 or storage connectivity manager 908 in order to install, integrate, and activate the storage connectivity module in DFE 106. In another embodiment, a standard installation program may be provided to integrate, configure, and activate the use of the plug-in in DFE 106.

For example, when first storage connectivity module 1512 is created, it will load first APIs 1510 from API component 1602. A plurality of APIs may be loaded to first storage connectivity module 1512. First storage connectivity module 1512 implements first API 1608, second API 1610, third API 1612, up to Nth API 1614. Second storage connectivity module 1516 also loads second APIs 1514 using the same process from API component 1602. Second storage connectivity module 1516 implements first API 1608, second API 1610, third API 1612, up to Nth API 1614 as well. Any number of APIs may be implemented by the storage connectivity modules.

In some embodiments, configuration settings 1606 of the different storage devices may be stored at DFE 106. Configuration settings 1606 may be used to provide additional data along with the APIs provided to the specific storage connectivity modules to tailor the APIs to the storage device. For example, configuration settings 1606 may indicate whether a storage device is a smart device, capable of providing instructions back to DFE 106. Alternatively, configuration settings 1606 may be provided to each storage connectivity module based on which storage device is connected thereto.

Each storage connectivity module may include a header file to facilitate integration of the module within storage connectivity manager 908 or DFE 106. The header file may be a file that contains function declarations and macro definitions to be shared between several source files. First storage connectivity module 1512 may include header file 1624 and second storage connectivity module 1516 may include header file 1626. In some embodiments, the storage connectivity module may not need to have a header file as the storage connectivity module may be installed into storage connectivity manager 908 using standard installer programs.

Figure 17:
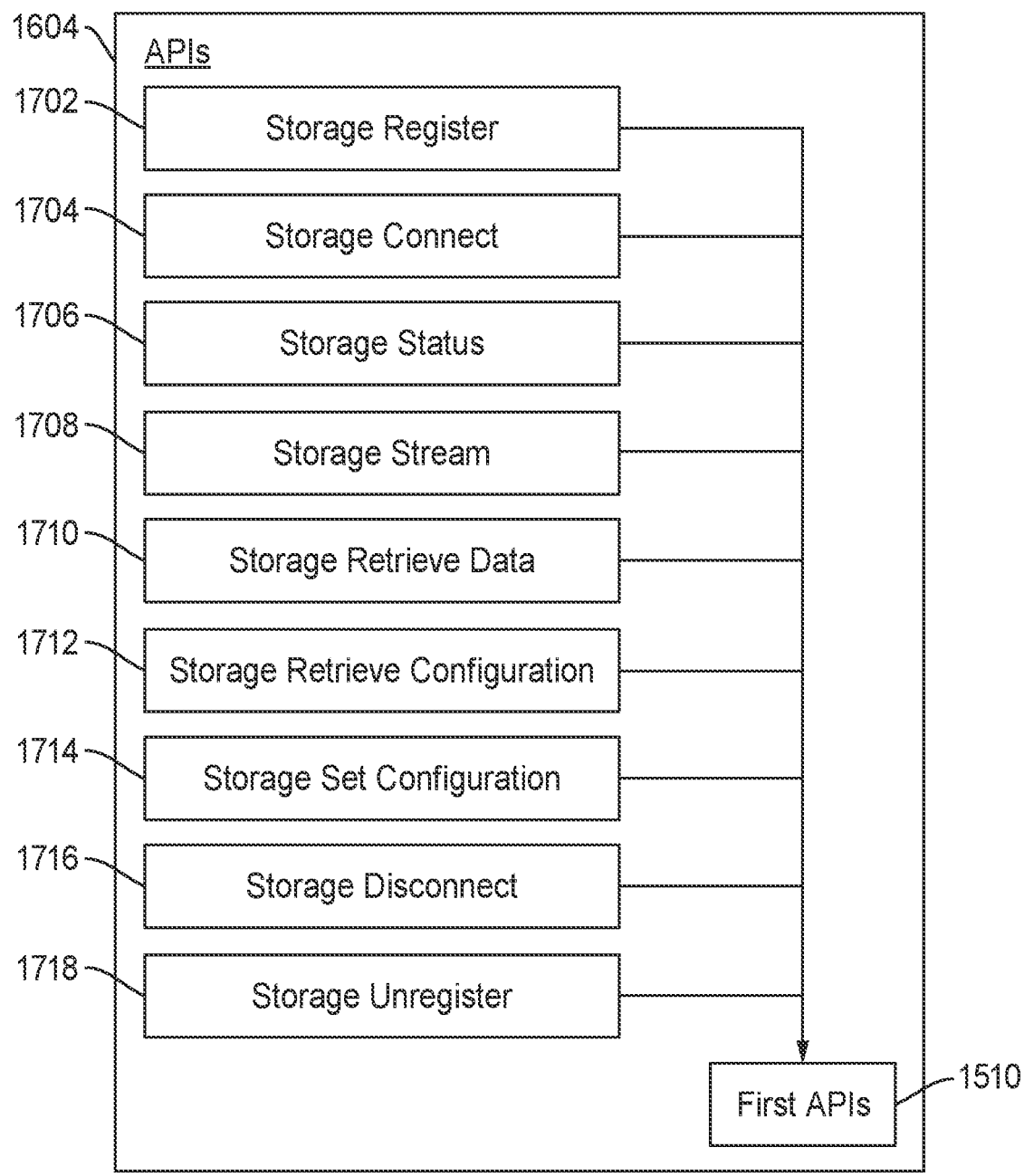
FIG. 17 illustrates a block diagram of a plurality of APIs for use within storage connectivity modules according to the disclosed embodiments.

FIG. 17 depicts a block diagram of a plurality of APIs for use within storage connectivity modules of storage connectivity manager 908 according to the disclosed embodiments. As disclosed above, storage connectivity APIs are implemented by the storage connectivity modules to provide the functionality in communicating with the data storage and storage devices connected to DFE 106. APIs 1604 may include pre-defined APIs that provide storage device communication and support for DFE 106.

As disclosed above, an API provides the means for two or more computer programs, such as third storage connectivity module 1520 and application 1530 of smart data storage device 1504, to communicate with each other. APIs 1604 connect DFE 106 to the data storage and storage devices within printing system 100. An API specification may define how the APIs are to be used by the storage connectivity modules.

Referring to FIG. 17, examples of interface functions are disclosed. Other interfaces may be defined, identified, or added to APIs 1604, as needed. Further, the data exchanged through APIs 1604 may vary in format, as necessary. DFE 106 may add or remove an API from APIs 1604 as needed to update the capabilities of the DFE system. This feature alleviates the need to update the software of DFE 106.

Storage register API 1702 may register data storage or storage device information. When implemented within a storage connectivity module, storage register API 1702 receives the storage device information. For example, storage register API 1702, if used within first APIs 1510, may register storage information for DFE data storage 912. Storage register API 1702 enables storage connectivity manager 120 to recognize a connection to a new storage device. It also allows storable data to be streamed to a connected storage device.

Storage connect API 1704 may enable connectivity to the registered data storage or storage device. This API allows DFE 106 to establish a connection session between the storage connectivity module and the corresponding data storage or storage device. For example, third storage connectivity module 1520 may use storage connect API 1704 within third APIs 1518 to establish connection 1538 with smart data storage device 1504.

Storage status API 1706 allows DFE 106 to retrieve the status of a connected data storage or storage device. When implemented within a storage connectivity module, storage status API 1706 detects and retrieves the status for the connected data storage or storage device, such as on, off, busy, and the like. For example, second storage connectivity module 1516 may use storage status API 1706 within second APIs 1514 to detect and retrieve the status of simple data storage device 1502. Simple data storage device 1502, for example, may be turned off.

Storage stream API 1708 sends storable data to the connected data storage or storage device. When implemented within a storage connectivity module, storage stream API 1708 sends storable data from DFE 106 to the corresponding data storage or storage device. For example, first storage connectivity module 1512 may use storage device stream API 1708 within first APIs 1510 to send, or stream, first storable data 1522 to DFE data storage 912.

Storage retrieve data API 1710 retrieves some data from the storage device, if possible. When implemented within a storage connectivity module, storage retrieve data API 1710 retrieves data from the connected data storage or storage device, if the storage device is able to send data. Some data may include a device identification, IP address, and the like, if applicable. For a smart storage device, instructions may be retrieved. For example, third storage connectivity module 1520 may use storage retrieve data API 1710 to retrieve instructions 1550 from smart data storage device 1504.

Storage retrieve configuration API 1712 detects and retrieves data storage and storage device attributes, such as disk size, free disk space, disk speed, and other supported capabilities. When implemented within a storage connectivity module, storage retrieve configuration API 1712 may retrieve the storage attributes from a connected data storage or storage device. For example, second storage connectivity module 1516 may use storage retrieve configuration API 1712 to retrieve the free disk space available on simple data storage device 1502 using connection 1536.

Storage set configuration API 1714 sets or makes changes to the storage device configuration that may be possible to change via the established connection. When implemented within a storage connectivity module, storage set configuration API 1714 may change the data storage or storage device configuration or settings. For example, first storage connectivity module 1512 may use storage set configuration API 1714 to change the storage configuration of DFE data storage 912 using connection 1534.

Storage disconnect API 1716 disconnects the data storage or storage device from DFE 106. When implemented within a storage connectivity module, storage disconnect API 1716 disconnects the associated data storage or storage device from DFE 106. For example, third storage connectivity module 1520 may disconnect smart data storage device 1504 from DFE 106 using storage disconnect API 1716 to end connection 1538.

Storage unregister API 1718 removes registration information for a data storage or storage device from DFE 106. This feature will prevent future use of the data storage or storage device in printing system 100. In some embodiments, DFE data storage 912 may not be unregistered. When implemented within a storage connectivity module, storage unregister API 1718 removes the registration information for the corresponding data storage or storage device from DFE 106 so that future connections are not established therewith.

For example, second storage connectivity module 1516 may use storage unregister API 1718 to remove registration information for simple data storage device 1502 from DFE 106. A connection may not be established between DFE 106 and simple data storage device 1502 until the storage device registers with storage register API 1702.

These APIs may be used for first API 1608, second API 1610, third API 1612, and so on up to Nth API 1614. Other APIs also may be implemented by storage APIs 1604. Other interface functions may be added, redefined, or modified. Standard APIs that exist without being pre-defined also may be implemented. As shown in FIG. 17, storage APIs 1604 may be used to implement first APIs 1510 for first storage connectivity module 1512.

Figure 18:
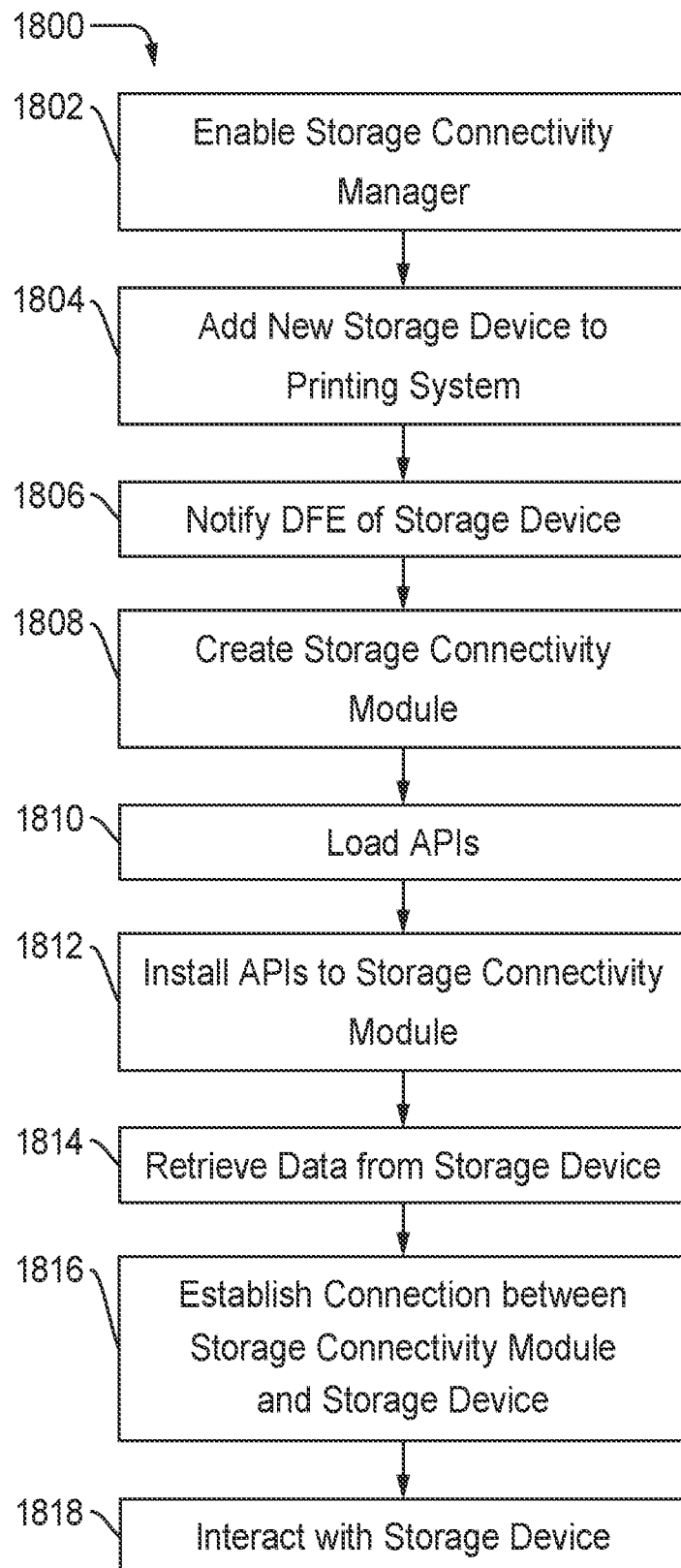
FIG. 18 illustrates a flowchart for creating and implementing a storage connectivity module within the storage connectivity manager according to the disclosed embodiments.

FIG. 18 depicts a flowchart 1800 for creating and implementing a storage connectivity module within storage connectivity manager 908 according to the disclosed embodiments. Flowchart 1800 may refer to FIGS. 1A-17 for illustrative purposes. Flowchart 1800, however, is not limited to the embodiments disclosed by FIGS. 1A-17.

Step 1802 executes by enabling storage connectivity manager 908 at DFE 106. DFE 106 may install storage connectivity manager 908 along with API component 1602, which includes APIs 1604 for use in communicating and interacting with the data storage and storage devices within printing system 100. Storage connectivity manager 908 allows DFE 106 to dynamically interact with various devices within printing system 100. This component also maintains and manages the list of data storage and storage device connections and identifies the storage connectivity module in which to interact in communicating with a specific data storage or storage device.

Step 1804 executes by adding a new storage device to printing system 100. The new storage device also connects with DFE 106. For example, smart data storage device 1504 may be added to printing system 100. Simple data storage device 1502 may already be connected to DFE 106. Step 1806 executes by notifying DFE 106 of the new storage device. DFE 106 seeks to establish a connection with the new storage device. For example, DFE 106 needs to establish connection 1538 with smart data storage device 1504.

Step 1808 executes by creating third storage connectivity module 1520 in storage connectivity manager 908. Third storage connectivity module 1520 may be an installable plug-in component within storage connectivity manager 908. Step 1810 executes by loading a plurality of APIs at storage connectivity manager 908 to implement third storage connectivity module 1520. The new storage connectivity module may call to API component 1602 to retrieve or load third APIs 1518 from APIs 1604.

Step 1812 executes by installing third APIs 1518 at third storage connectivity module 1520. Third APIs 1518 provide the interfaces within third storage connectivity module 1520 to manage, handle, or transmit third storable data 1526 within DFE 106. Step 1814 executes by retrieving data and information from smart data storage device 1504, newly added to printing system 100. This data and information may include storage device capabilities, smart device information, if applicable, unique identification information, and the like. For example, the information may include a device serial number, IP address, and the like as well as storage device settings.

Step 1816 executes by establishing connection 1538 between third storage connectivity module 1520 and smart data storage device 1504. Storage connectivity manager 908 may update its list of connected data storage and storage devices with this connection. Step 1818 executes by interacting with smart data storage device 1504 from DFE 106 using third storage connectivity module 1520. Such an interaction may include streaming third storable data 1526 or receiving instructions 1550 from smart data storage device 1504.

FIG. 19 depicts a flowchart 1900 for a workflow within a DFE with storage connectivity manager 908 according to the disclosed embodiments. Flowchart 1900 may refer to FIGS. 1A-18 for illustrative purposes. Flowchart 1900, however, is not limited to the embodiments disclosed by FIGS. 1A-18.

Step 1902 executes by selecting a printing device, such as printing device A 104, within printing system 100 to execute print job 103. Step 1902 is similar to step 1402, disclosed above. Step 1904 executes by notifying printing device connectivity manager 120 about the selected printing device. Step 1904 is similar to step 1404, disclosed above. Step 1906 executes by identifying the applicable printing connectivity module for the selected printing device. Step 1906 is similar to step 1406, disclosed above. Step 1908 executes by interacting with printing device A 104 using APIs X 122 of printing connectivity module A 124. Step 1908 is similar to step 1408, disclosed above.

Step 1910 executes by selecting stages of processing within DFE 106 to provide storage data. Printing device connectivity manager 120 may select the stages. As disclosed above, processing of print job 103 may occur in several stages. Printing device connectivity manager 120 indicates which stage or stages will send storable, or processed, data to store within printing system 100. It should be noted that the storable data is generated within DFE 106 and not necessarily at printing device A 104.

Step 1912 executes by sending the storable data from DFE 106 during the selected stages by printing device connectivity manager 120. Printing device connectivity manager 120 may receive the storable data from the applicable component within DFE 106, such as RIP firmware 190. Step 1914 executes by detecting low free space during the receipt of the storable data. DFE 106 may detect a low free space situation in DFE data storage 912 using first storage connectivity module 1512. DFE 106 may call an API to send low-priority data to external or remote storage vie storage connectivity APIs in the storage connectivity modules of storage connectivity manager 908.

Step 1916 executes by retrieving the storable data from DFE 106 by printing device connectivity manager 120. Step 1918 executes by receiving the storable data at storage connectivity manager 908 from printing device connectivity manager 120 or DFE 106. For example, first storage connectivity module 1512 indicates to DFE 106 that DFE data storage 912 is low on free space. DFE 106 then generates second storable data 1524 or third storable data 1526 that needs to be stored on an external storage device. Second storable data 1524 or third storable data 1526 may be received at storage connectivity manger 908.

Step 1920 executes by selecting activated storage connectivity modules within storage connectivity manager 908. Activated storage connectivity modules may indicate that the corresponding storage devices are active and able to receive data. Step 1922 executes by determining storage locations or storage devices that have free space to store data. Storage connectivity manager 908 may query the connected storage devices using the storage connectivity modules. For example, simple data storage device 1502 may provide information on available free space using connection 1536 with second storage connectivity module 1516. Smart data storage device 1504 may provide information on available free space using connection 1538 with third storage connectivity module 1520.

Step 1924 executes by relaying the storable data to active storage connectivity modules that report free space. In some embodiments, processes may be developed to select the best usage of reported available storage space between all connected storage devices. For example, the process may be first come-first use, most free space first, fastest storage device first, and the like. For example, the process may indicate that smart data storage device 1504 has the most free space available. Thus, storage connectivity manager 908 may relay the storable data to third storage connectivity module 1520.

Step 1926 executes by transmitting the storable data to the connected storage device or devices, as determined above. For example, the storable data may be transmitted to smart data storage device 1504 until a low space condition occurs. Then, storage connectivity manager 908 may select simple data storage device 1502 to receive the remaining storable data generated from print job 103. At some point subsequent to storing the storable data, DFE 106 may retrieve the storable data from the external storage devices as well as DFE data storage 912. DFE 106 may use the activated storage connectivity modules within storage connectivity manager 908 to communicate and interact with the respective data storage and storage devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing display operations in a printing system, the method comprising:
    enabling a display device connectivity manager at a digital front end (DFE);
    creating a display connectivity module in the display device connectivity manager, wherein the display connectivity module corresponds to a display device connected to the DFE;
    loading a plurality of application programming interfaces (APIs) at the display device connectivity manager to implement the display connectivity module;
    installing the plurality of APIs to the display connectivity module, wherein the plurality of APIs provides interfaces within the display connectivity module to manage, handle, or transmit viewable page image data within the DFE;
    interacting with the display device from the DFE using the display connectivity module; and
    providing the viewable page image data to the display device.

2. The method of claim 1, wherein providing the viewable page image data includes continuously transmitting the viewable page image data to the display device.

3. The method of claim 1, wherein providing the viewable page image data includes responding to a signal from the display device to transmit the viewable page image data.

4. The method of claim 1, wherein the viewable page image data corresponds to a print job received at a printing device connected to the DFE.

5. The method of claim 4, wherein the viewable page image data is rasterized image data of the print job.

6. The method of claim 1, wherein providing the viewable page image data includes providing diagnostic data, core dump data, configuration data, or maintenance data regarding a printing device connected to the DFE.

7. The method of claim 1, further comprising transmitting viewable page image data at a specific time.

8. The method of claim 1, wherein the display device is a smart display device that responds to the display connectivity module.

9. The method of claim 1, wherein the display connectivity module includes a dynamic link library (DLL) to provide the plurality of APIs.

10. A method for managing printing operations in a printing system, the method comprising:
    enabling a printing device connectivity manager at a digital front end (DFE);
    creating a printing connectivity module in the printing device connectivity manager, wherein the printing connectivity module corresponds to a printing device connected to the DFE;
    loading a first plurality of application programming interfaces (APIs) at the printing device connectivity manager to implement the printing connectivity module;
    installing the first plurality of APIs to the printing connectivity module, wherein the first plurality of APIs provides interfaces within the printing connectivity module to manage, handle, or transmit a translated print job within the DFE;
    enabling a display device connectivity manager at the printing device connectivity manager;
    creating a display connectivity module in the display device connectivity manager, wherein the display connectivity module corresponds to a display device connected to the DFE;
    loading a second plurality of application programming interfaces (APIs) at the display device connectivity manager within the printing device connectivity manager to implement the display connectivity module;
    installing the second plurality of APIs to the display connectivity module, wherein the second plurality of APIs provides interfaces within the display connectivity module to manage, handle, or transmit viewable page image data of the translated print job provided by the printing connectivity module within the DFE;
    interacting with the display device from the DFE using the display connectivity module; and
    providing the viewable page image data to the display device.

11. The method of claim 10, wherein the DFE includes a raster image processor to convert a print job into the translated print job.

12. The method of claim 10, wherein providing the viewable page image data includes providing diagnostic data, core dump data, configuration data, or maintenance data regarding a printing device connected to the DFE.

13. The method of claim 10, wherein providing the viewable page image data includes continuously transmitting the viewable page image data to the display device.

14. The method of claim 10, wherein providing the viewable page image data includes responding to a signal from the display device to transmit the viewable page image data.

15. The method of claim 10, wherein the printing connectivity module includes a first dynamic link library (DLL) to provide the first plurality of APIs.

16. The method of claim 10, wherein the display connectivity module includes a second dynamic link library (DLL) to provide the second plurality of APIs.

17. A digital front end (DFE) server comprising:
a processor;
a memory connected to the processor, the memory storing instructions that, when executed on the processor, configure the DFE to
enable a display device connectivity manager at the DFE;
create a display connectivity module in the display device connectivity manager, wherein the display connectivity module corresponds to a display device connected to the DFE;
load a plurality of application programming interfaces (APIs) at the display device connectivity manager to implement the display connectivity module;
install the plurality of APIs to the display connectivity module, wherein the plurality of APIs provides interfaces within the display connectivity module to manage, handle, or transmit viewable page image data within the DFE;
interact with the display device from the DFE using the display connectivity module; and
provide the viewable page image data to the display device.

18. The DFE of claim 17, wherein providing the viewable page image data includes continuously transmitting the viewable page image data to the display device.

19. The DFE of claim 17, wherein providing the viewable page image data includes responding to a signal from the display device to transmit the viewable page image data.

20. The DFE of claim 17, wherein the instructions further configure the DFE to create a printing connectivity module in a printing device connectivity manager, wherein the printing connectivity module corresponds to a printing device connected to the DFE.

* * * * *